US008122475B2

(12) United States Patent
Osann, Jr. et al.

(10) Patent No.: US 8,122,475 B2
(45) Date of Patent: Feb. 21, 2012

(54) REMOTE CONTROL FOR VIDEO MEDIA SERVERS

(76) Inventors: Robert Osann, Jr., Cupertino, CA (US); Joseph A. Zott, Menlo Park, CA (US); Samuel W. Beal, Mountain View, CA (US)

( * ) Notice: Subject to any disclaimer, the term of this patent is extended or adjusted under 35 U.S.C. 154(b) by 804 days.

(21) Appl. No.: 12/069,877

(22) Filed: Feb. 12, 2008

(65) Prior Publication Data

US 2008/0209487 A1  Aug. 28, 2008

Related U.S. Application Data

(60) Provisional application No. 61/003,363, filed on Nov. 16, 2007, provisional application No. 60/901,671, filed on Feb. 13, 2007.

(51) Int. Cl.
*H04N 7/173* (2011.01)

(52) U.S. Cl. ........... 725/82; 725/110; 370/392; 709/203

(58) Field of Classification Search .................. 725/109, 725/110; 370/389, 392, 401, 402, 352
See application file for complete search history.

(56) References Cited

U.S. PATENT DOCUMENTS

| | | | | |
|---|---|---|---|---|
| 5,877,765 | A * | 3/1999 | Dickman et al. ............. | 715/738 |
| 6,883,000 | B1 * | 4/2005 | Gropper ............................... | 1/1 |
| 7,996,863 | B2 * | 8/2011 | Wiltheiler ....................... | 725/38 |
| 2002/0049974 | A1 * | 4/2002 | Shnier ............................ | 725/47 |
| 2002/0152228 | A1 * | 10/2002 | Lopez et al. .................. | 707/202 |
| 2002/0170067 | A1 * | 11/2002 | Norstrom et al. ............. | 725/109 |
| 2003/0046584 | A1 * | 3/2003 | Laksono ........................ | 713/201 |
| 2005/0120221 | A1 * | 6/2005 | Arnold et al. ................. | 713/182 |
| 2005/0138033 | A1 * | 6/2005 | Katta et al. ........................ | 707/10 |
| 2007/0162939 | A1 * | 7/2007 | Bennett et al. .................. | 725/74 |
| 2007/0162945 | A1 * | 7/2007 | Mills .............................. | 725/119 |
| 2009/0228936 | A1 * | 9/2009 | Davis et al. ..................... | 725/80 |
| 2011/0219413 | A1 * | 9/2011 | Krikorian et al. ............. | 725/109 |

OTHER PUBLICATIONS www.LogMeIn.com—Webpage describing remote control software for IT applications—printed Dec. 15, 2010.
www.GoToMyPC.com—Webpage describing remote control software for IT applications—printed Dec. 15, 2010.
www.UVNC.com—Webpage describing remote control software for IT applications—printed Dec. 15, 2010.

* cited by examiner

*Primary Examiner* — Scott Beliveau
*Assistant Examiner* — Alan Luong

(57) ABSTRACT

Systems and methods are described for remote control of a media server computer from a controller device, typically a laptop computer, where remote operation of the media server, including the selection of videos and other digital media may be performed from the controller while normal TV programming (cable, satellite, or broadcast) is viewed on the TV. Other embodiments describe background operations performed on the controller device, the media server, or both, such that new videos may be located on the web or locally on the LAN while a current video is playing on the media server and viewed on the TV. Methods are also described for more reliably establishing network connections between the controller and media server, and systems and methods are described for implementing a multi-video display on the media server where videos to be displayed on the media server are displayed on and selected by a controller device.

4 Claims, 21 Drawing Sheets

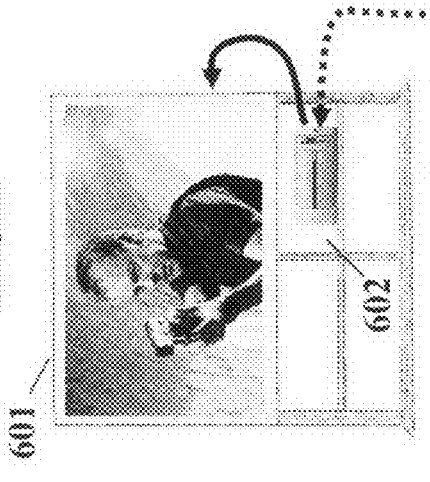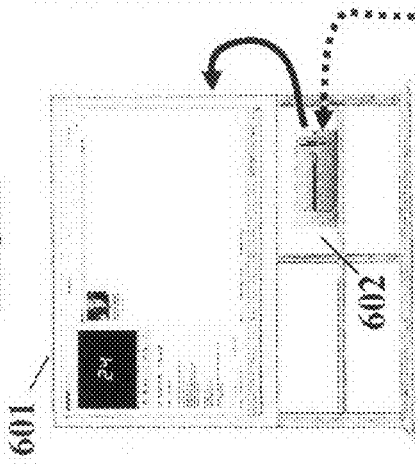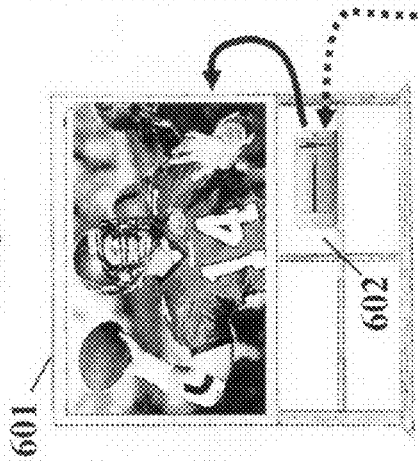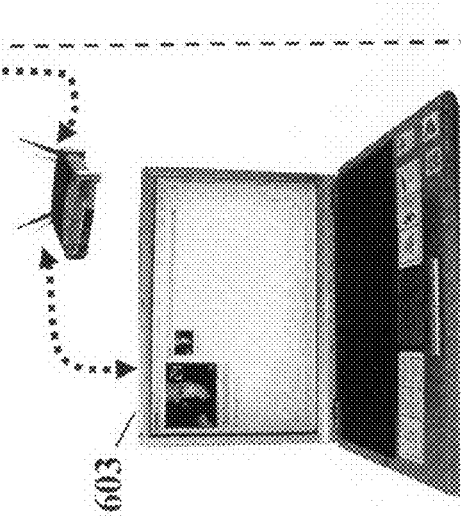
Figure 6

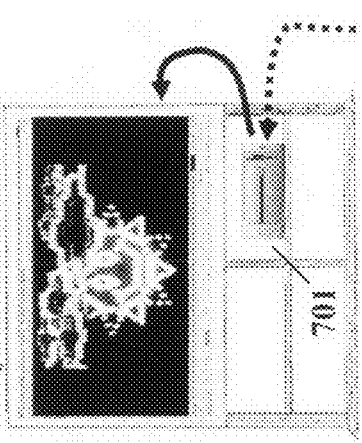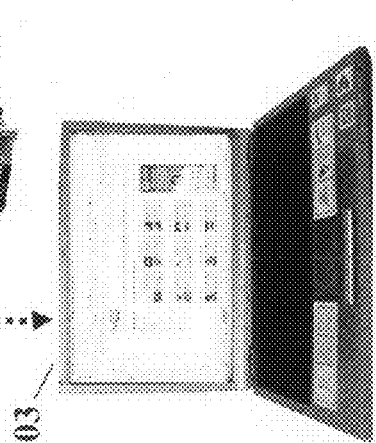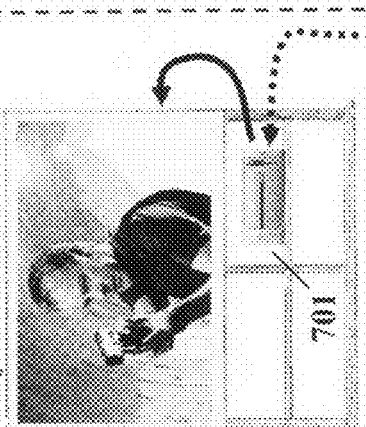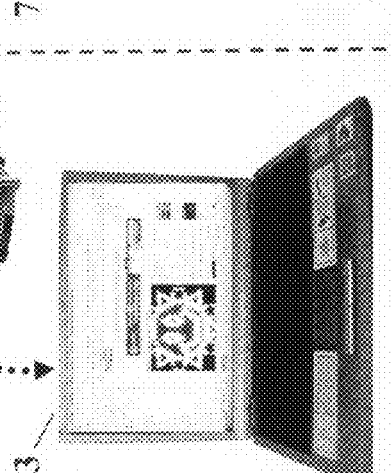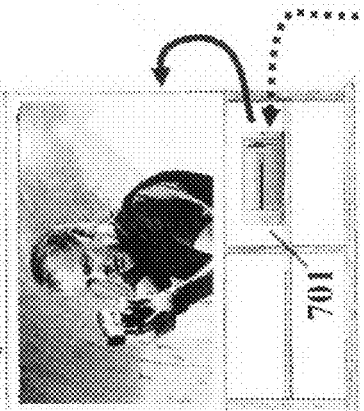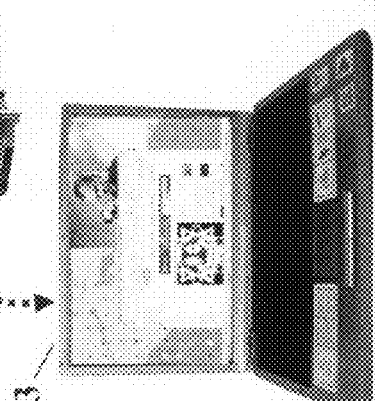
Figure 7

Activity Clone:
Process run on Controller is cloned on Media Server
(Delayed or Realtime)

1201 — User opens a first Activity Master browser window on controller device and locates a first video. All Activity (both user and browser response) in this window is recorded. This may be done without disturbing a previously chosen video currently playing on Media Server/TV.

1202 — Upon initiation by user, recorded activity on controller is cloned on the Media Server, so that if enabled by controller, video streams from the Internet to both the Server and controller device simultaneously. Potentially, a multicast could be used to do this using wireless spectrum more efficiently. If user wishes to open a second Activity Master browser window, video stream to controller may optionally or automatically be suppressed when the first Activity Master window on controller device is not the active window.

Cloned activity may be initially recorded and delayed as described above, or alternately, activity in an Activity Master window on controller device may be cloned in realtime so that activity on Media Server/TV is substantially identical to that observed on controller device.

Figure 12

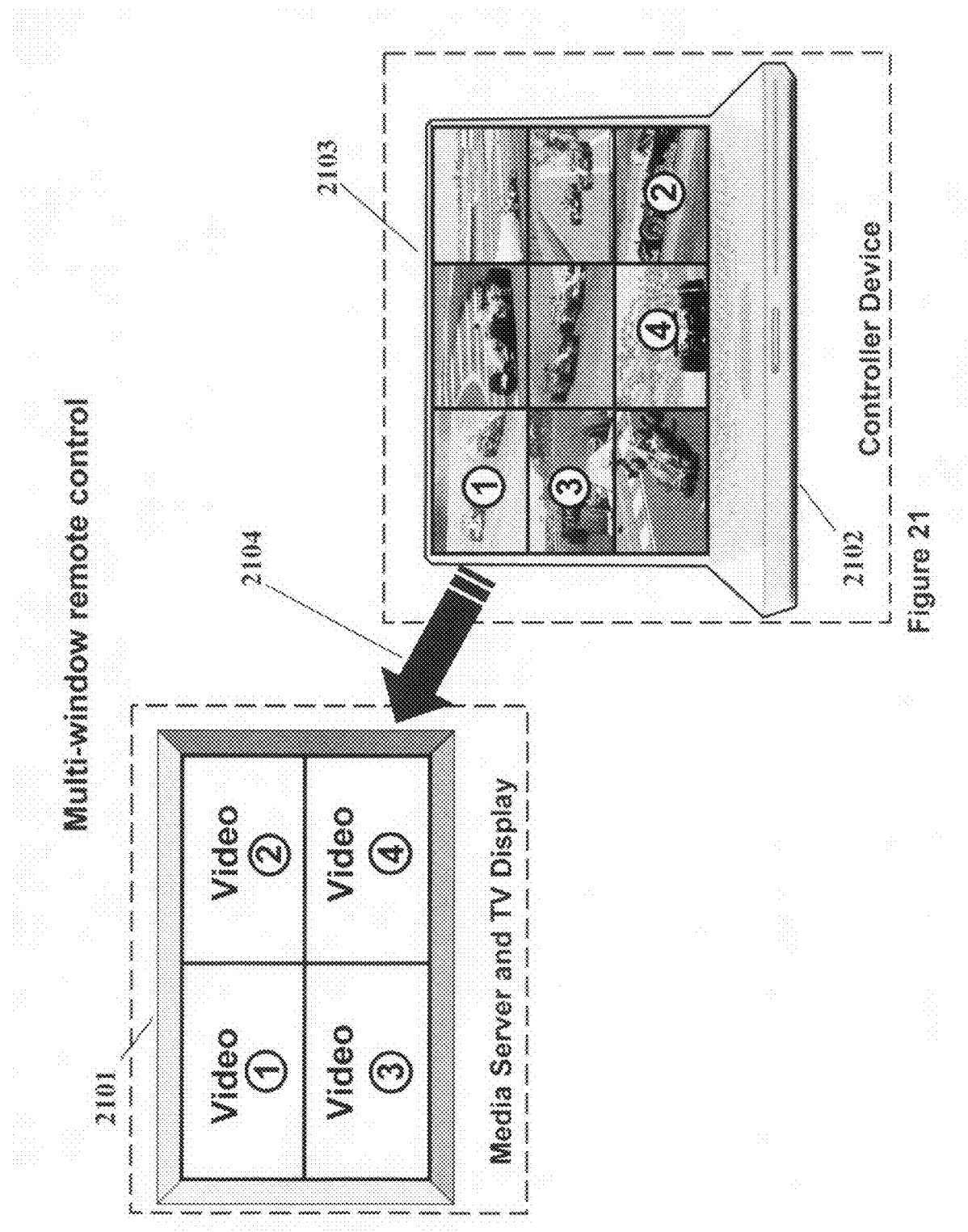

REMOTE CONTROL FOR VIDEO MEDIA SERVERS

CLAIM OF PRIORITY

This application claims the benefit and priority of U.S. Provisional Application Ser. No. 60/901,671, filed on Feb. 13, 2007, and entitled "REMOTE CONTROL FOR VIDEO MEDIA SERVERS," by inventors Robert Osann, Jr. and Samuel W. Beal, and U.S. Provisional Application Ser. No. 61/003,363, filed on Nov. 16, 2007, and entitled "MEDIA PLAYLIST MANAGEMENT AND VIEWING REMOTE CONTROL," by inventors Joseph A. Zott, Samuel W. Beal, and Robert Osann, Jr., both of said applications commonly assigned with the present application and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to video media server computers, and in particular, methods for controlling media servers used by consumers in their home for viewing videos that are either streamed from the web or previously downloaded and stored on a media server or elsewhere on their LAN. For the purpose of this specification, a "media server" may be any form of computer system that includes all of the following: a processor, a video decompression capability, a video output display capability, and a network connection capability. Video media servers may include, without limitation, any of desktop computers, laptop computers, small form-factor PCs, Wireless Media Players, media extenders, video set-top boxes, game boxes, or DVRs (Digital Video Recorders).

BACKGROUND

Today, videos which may be downloaded or streamed from the web are becoming ever more available at an explosive rate. However, it seems that those providing these videos still expect the consumer to watch them on their PC as no suitable technology or methodology is being supplied to enable easy and convenient watching of these videos on the primary family entertainment TV.

Numerous paradigms have been offered in the past, and these are discussed as follows:

FIG. 1 shows a media server computer 101 connected to a TV 102, where the TV is the sole display for the computer. The user is expected to control the computer with a conventional keyboard 103 and mouse, these being either wired to the computer or alternately wireless as shown in FIG. 1. If the keyboard and mouse are wired to the computer, then the individual must be close to the computer and therefore may not comfortably control the computer from their couch or normal TV viewing chair. If the keyboard and mouse are wireless, then the user may control the computer from their couch, however they may find the text on the screen to be painfully small and difficult to see. More important is the fact that while they browse the web with the primary family TV acting as the media server display, the family may no longer view normal TV programming (cable or satellite TV) since the display is occupied with a web browser. Therefore, this paradigm is extremely similar to that offered in the mid-90s by Microsoft called "Web TV" which did not succeed, primarily because of this effect of interfering with normal family viewing on the primary TV.

FIG. 2 shows a newer development called a Wireless Media Player. The idea here is that video files may be located on a media server 201 located somewhere on the LAN, and these files are accessible to the Wireless Media Player 202 by way of a wireless connection 203. The Wireless Media Player is then connected directly to the TV 204 and controlled by a local hand-held remote control 205. The user may then, by way of the Wireless Media Player, peruse the directory structure on a media server via the LAN, choose a video file to be viewed, and then stream that video file through the Wireless Media Player to the TV. This limits the available videos to those previously saved somewhere on the LAN and precludes browsing for videos on the web via the Wireless Media Player. This paradigm requires videos to be able to be saved locally on the LAN, which is often not allowed these days for videos supplied by many web-based media providers due to DRM (Digital Rights Management) issues. The CODEC (compression/decompression) functions within the Wireless Media Player are not easily updatable as are CODECs which run as software on conventional PCs, and therefore Wireless Media Players are unable to play all popular video file types. Also, web-based media suppliers are often requiring that videos run in a proprietary software player that they supply which runs on a PC, also precluding the use of a Wireless Media Player.

FIG. 3 shows a Windows Media Center PC 301, one of the currently popular paradigms. This PC comes with a handheld remote control 302, however this is only useful for perusing previously saved files on PC 301 or for operating a software based DVR function where programs are recorded from the TV 303 and played back later. Any web browsing to locate and download or stream videos would be subject to limitations of the paradigm described in FIG. 1, and therefore the Windows Media Center PC does not fill all the requirements of a user who wishes to download and or stream web videos to their TV without leaving the comfort of their couch, and without disturbing their family's normal TV viewing while web videos are being located.

From the foregoing descriptions of existing paradigms, and from an examination of the various system components normally found in home entertainment centers supporting TV viewing, it is readily apparent that the opinion throughout the industry has been, and continues to be, that operation by a simple hand-held remote device is required for the remotely-controlled operation of any TV-related component. In spite of this, there is a growing trend for TV viewers to indulge in "multi-tasking" whereby they surf the web on their laptop computer while sitting on the couch with the family watching conventional (cable, satellite, or broadcast) TV programming. The present invention understands the unique opportunity supported by this trend and offers viewers the capability to use their laptop computer to control the play of video media, including web videos, on their TV, and to do so such that web media is located without disturbing their family's normal TV viewing.

It is known in the art to remotely control one or more computers by performing operations in a remote control window on a different computer. This functionality is primarily used by IT professionals for maintaining and updating large numbers of computers in an office environment, many of these remotely controlled computers being located in remote offices requiring accessing via the Internet. Programs supporting this kind of functionality include Microsoft's "Remote Desktop" and a program generically known in the industry as VNC. However, remote control of a computer by another computer has not been offered for the home environment to enable the unique controlling and viewing scenarios that are described herein.

SUMMARY

This invention describes systems and methods for remote controlling a media server computer from a controller or client device—most commonly a laptop computer. Methods are described where the media server is directly remotely controlled by a laptop computer as one example of a controller device. Optionally, a link to a web video may be located in a local window on the controller device while a current web video is playing on the media server, this link being passed by remote control to a media server for display on a TV, thereby replacing the current web video.

In other embodiments of this invention, methods are described where operations are performed in the background on the media server under remote control such that new videos may be located on the web or locally on the LAN while a current video is playing on the media server, again all operation being controlled from a remote controller device.

Another object of this invention is to provide transcoding functionality on the web such that a web video having a compression format not supported by a user's media server may be transcoded to provide a supported format.

Another object of this invention is to provide methods for establishing connections between controller devices and media servers on the LAN within a home in order to overcome the problems normally associated with establishing such connections.

Another object of this invention is to provide a multi-video display on a media server and TV, where the location and selection of videos is performed under remote control of a controller device.

Although the embodiments described herein often refer to media server PCs being controlled by laptop computers or PCs, it should be understood that the media server could be any computing device that meets the requirements described earlier under Field Of The Invention, and the reference to a "PC" does not preclude other personal computer types such as Macs or Linux-based computers. Also, the controller devices being described may be any form of laptop computer, PC or Mac, or may instead be other forms of wireless computing devices such as tablet PCs, PDAs, or wireless-enabled PDA-phones or smart phones.

BRIEF DESCRIPTION OF THE DRAWINGS

FIG. 6 shows a step-by-step process wherein a video source is located using a laptop computer for remote control of a media server while the TV set continues to play conventional satellite or cable programming, and when the user is ready, the located video source is then displayed on the TV by the media server.

FIG. 7 shows a step-by-step process where a first video source is currently displayed on the TV by a media server while a second video source is located using the controller laptop computer in conjunction with the media server.

FIG. 12 shows a flow chart for an alternate paradigm wherein the activity for video search and play in a local browser window on a controller device is cloned such that the same activity may be replicated on a media server connected to a TV.

FIG. 21 shows an overview of a multi-window, multi-view display on a media server and TV similar to FIG. 18, whereby videos chosen for display on the media server appear as a subset of a larger number of videos that are displayed on a controller device.

DETAILED DESCRIPTION OF THE INVENTION

Figure 1:
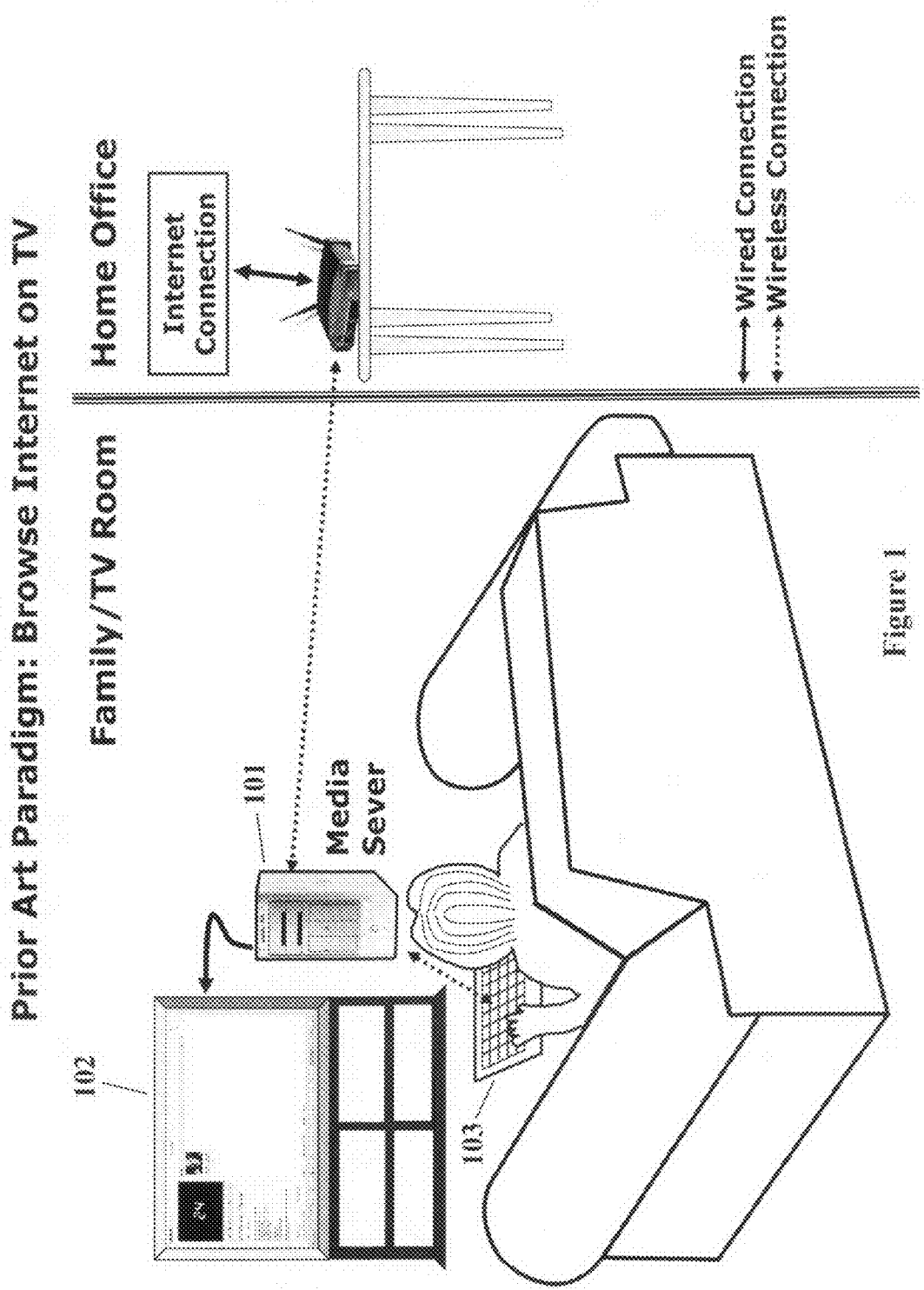
FIG. 1 shows a prior art paradigm where the output of a media server is connected to a TV set for its display, and the media server is controlled by a wireless or wired keyboard and mouse.
Figure 2:
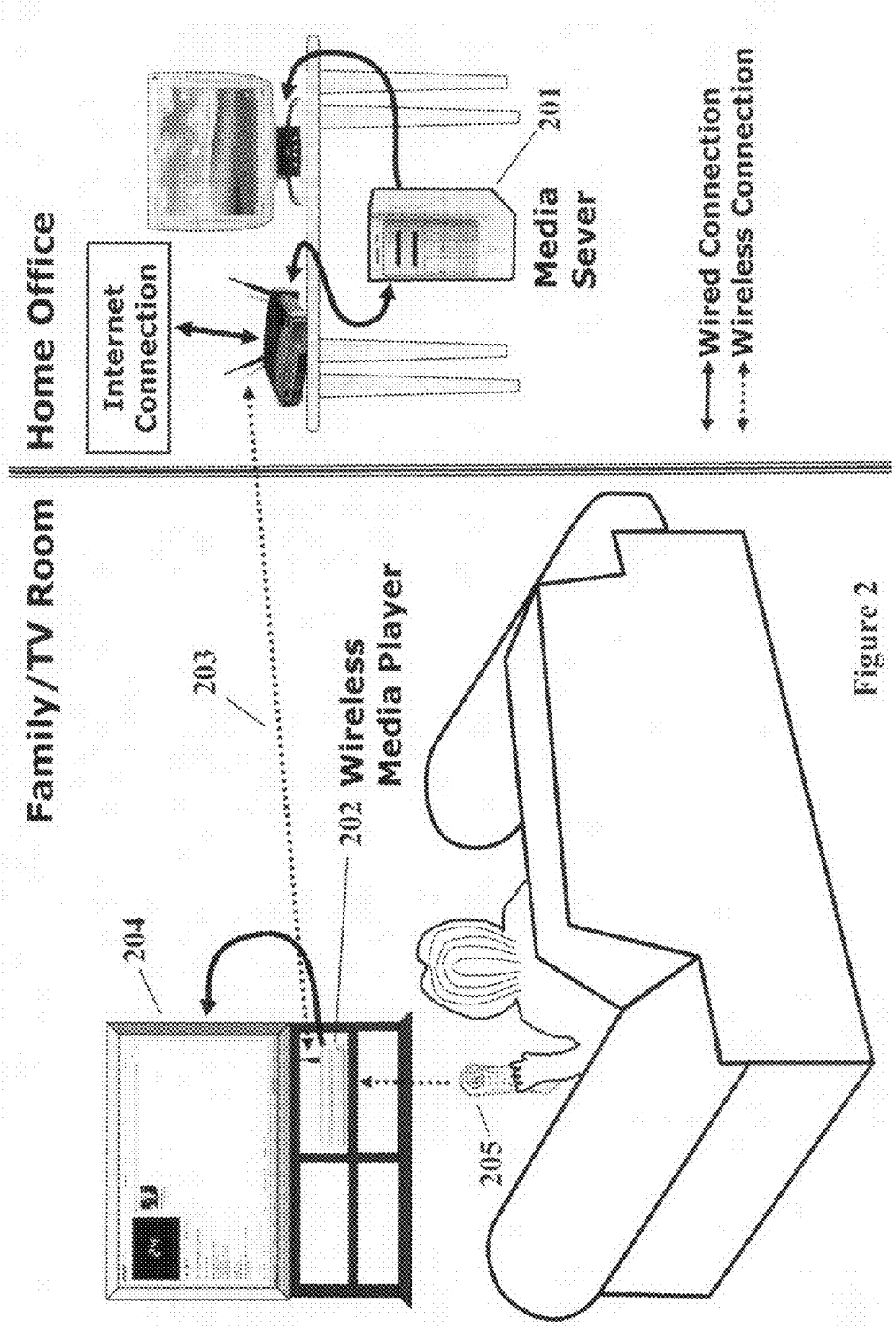
FIG. 2 shows a prior art paradigm where the output of a Wireless Media Player is connected to a TV set for display, and the Wireless Media Player is controlled from a handheld remote device.
Figure 3:
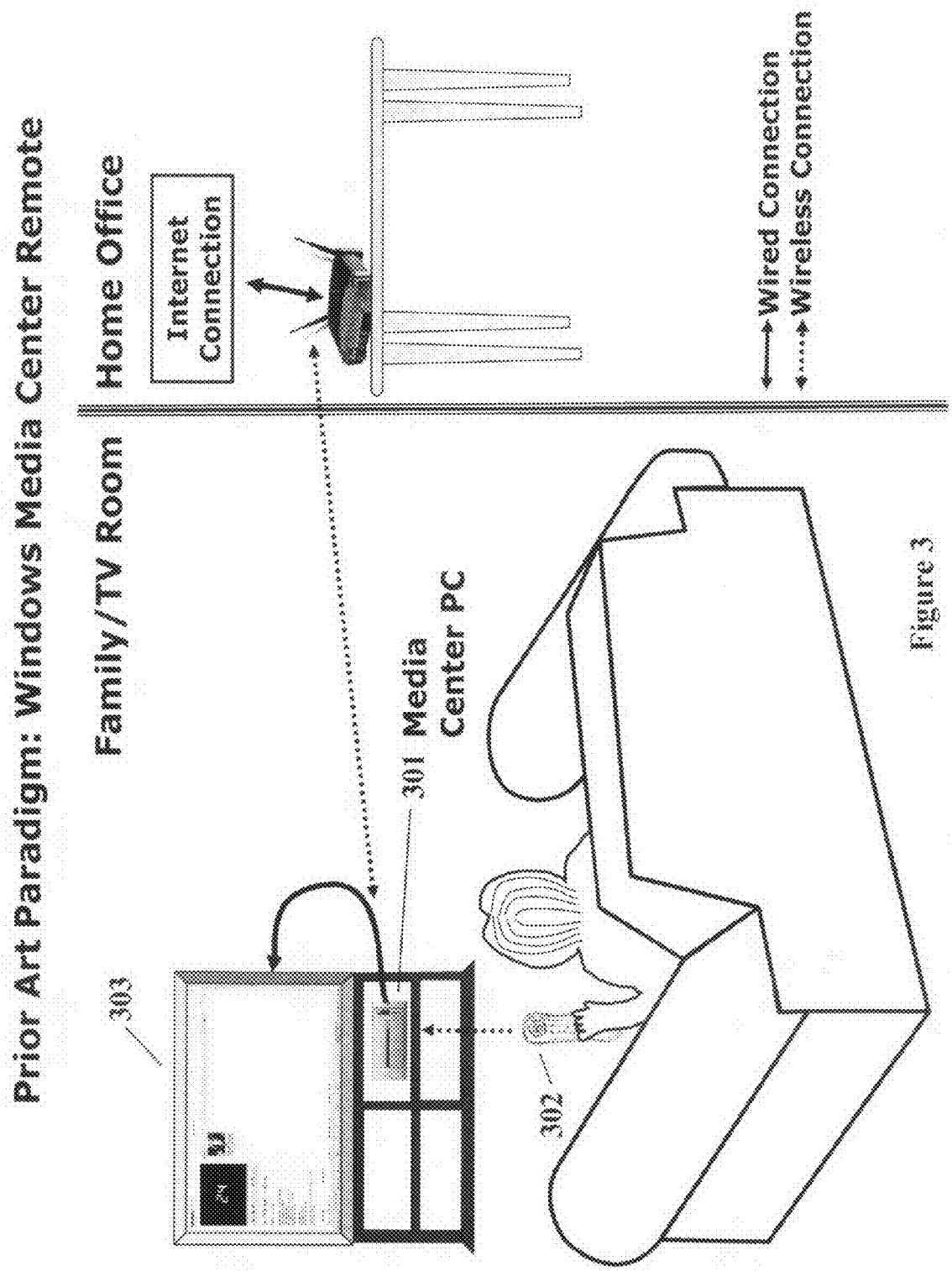
FIG. 3 shows a prior art paradigm where the output of a Media Center PC is connected to a TV set for display, and the Media Center PC is controlled from a handheld remote device.
Figure 4:
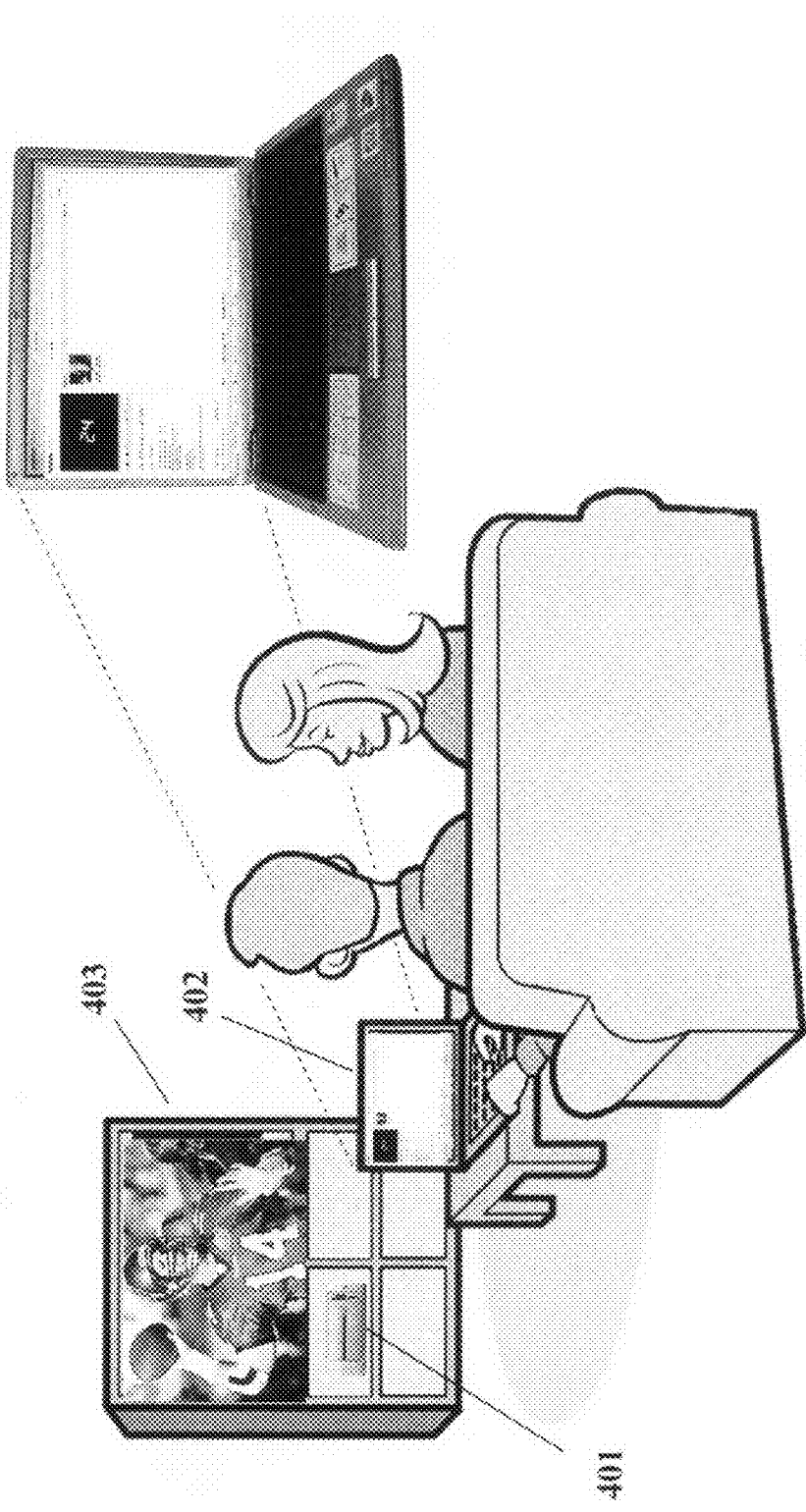
FIG. 4 shows an overview of the present invention where the user locates video sources using a laptop computer, remotely controlling a media server connected to a TV set in order to display videos streamed or downloaded from the video sources on the TV.

FIG. 4 shows a general view of this invention where the user is locating a video residing either on the web, on media server 401, or on the user's LAN, and accomplishes this by remotely controlling the media server from a window on their laptop (controller) computer 402. Notice that while the user is locating new video material to be played on the media server, the TV 403 may be playing TV programming from some other video source, such as cable or satellite TV, a DVD player, a DVR player, etc.

Figure 5:
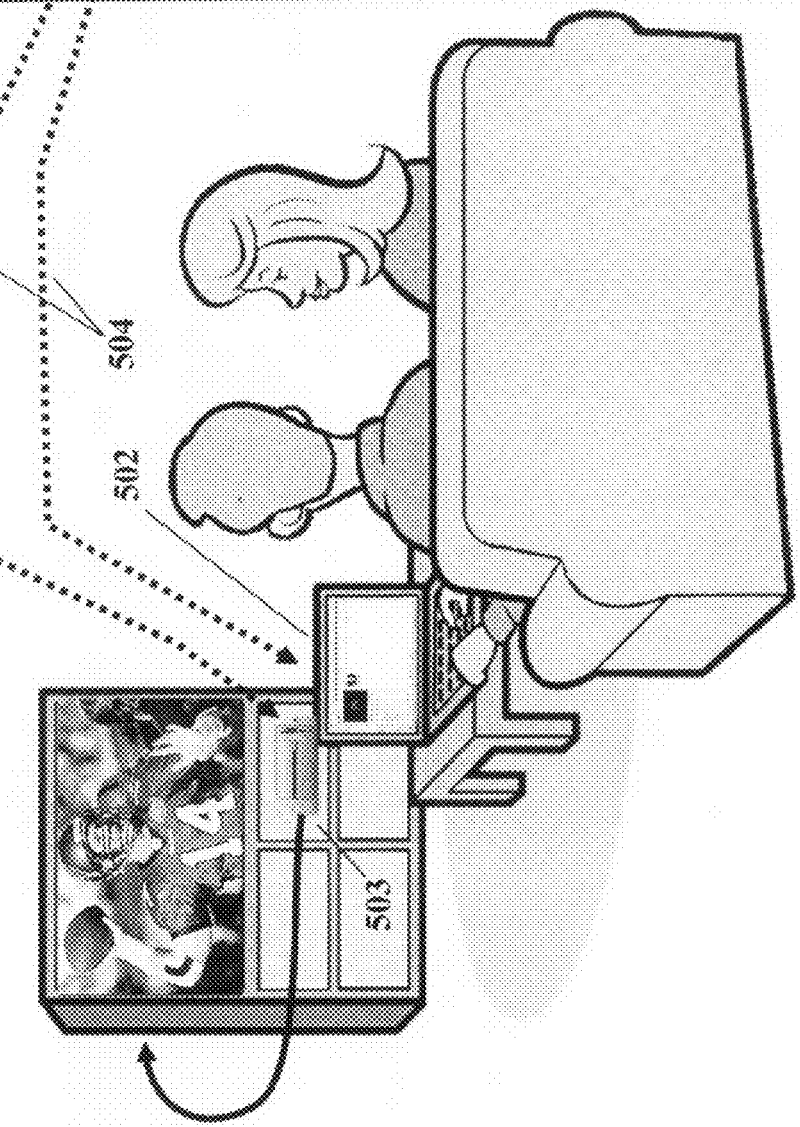
FIG. 5 shows for the scenario of FIG. 4 how the laptop computer controls the media server by way of a wireless LAN.

FIG. 5 shows the flow of information for the scenario of FIG. 4 where a wireless router 501 or access point is located somewhere in the home, frequently in a home office. Thus, although the laptop computer 502 is controlling the media server 503, information is flowing between the two devices by way of wireless network 504. Although this type of connectivity, known as infrastructure mode when one refers to WiFi scenarios, is shown here, it should be understood that a form of ad hoc communication could be utilized where the laptop computer 502 connects directly to the Media Server 503 via a direct wireless connection.

FIG. 6 shows a more detailed step-by-step example of how one remote control scenario of this invention might be implemented. In FIG. 6, step 1 shows a football game received from, for instance, a conventional cable or satellite TV programming source being shown on the TV 601. Simultaneously, the user chooses a video file or stream to be played next on the media server 602, controlling the media server from their laptop controller device 603 to make this choice, and viewing some portion of the media server desktop screen solely by way of a remote control window on controller device 603. Although the Media Server is actually running the software that enables choosing the video material that will be streamed from the web or played from a file, this operation is only initially visible through the laptop 603 acting as a remote controller device and remote viewer. The remote control window displays a fully functional recreation of at least a portion of the media server desktop screen, with all links and search control text boxes accessible to the user thus providing the user with operational control of the media server functionality that is visible to them through the active screen image appearing in the remote control window. Thus, the functionality available within the remote control window may include the entire desktop image of the media server screen, a portion of the desktop image, or a single window (either an active window or a hidden active window) from within the media server's desktop screen, or running in background mode on the media server as will be described later.

In step 2 of FIG. 6, the user has switched the source input on their TV 601 to allow viewing of the video output from the media server 602 and thus the information previously seen only remotely on the display of laptop controller device 603 is now viewed on the TV display 601. Step 3 shows the operation after the user has initiated viewing of the video on the media server 602. Notice that on their laptop remote controller device 603 they can see both the remote control window where the video is being played, and also other windows such as the web browser window shown, where they may now perform other operations either related or unrelated to the location and viewing of videos and other media.

A media server as described herein is a form of computer—be it a PC, a set-top box, or a game box, etc. It could even be an upgraded DVD player with more computer capability, or a DVR with expanded functionality. It may or may not have a disk for local data storage. A media server has a processor and some form of operating system. As such, the operating system may be multi-tasking and/or multi-processing. In a typical PC today with an operating system like Microsoft Windows, the operating system is both multi-processing and multi-tasking, however even though multiple processes may be running simultaneously, the user interface only allows interaction with one process at a time. Alternately per this invention, there may be multiple active windows on the media server that the user may interact with simultaneously—one that is user accessible in the normal way, and other "hidden active windows" that may be interacted with simultaneously by offering a second user interface that is operated via a remote control window on a controller device.

FIG. 7 shows additional functionality described for this invention that enables a second video to be located for the media server under control of a second remote control window on the laptop while a first video is being played by the media server on the TV. In other words, the second process (implemented as a "hidden active window") runs as a background process on the media server while its user interface is visible on the controller device. Here in step 1, a first web video is being played on the media server 701 and displayed on the TV 702. The user opens an additional remote control window on their laptop 703 to browse the web for another source of video, in this instance a site called YouTube.com. The second remote control window controls a process on the media server that runs in the background on the media server. Since this second process is not visible on the media server screen, the process is herein referred to as a "hidden active window" on the media server. In step 2, the user has chosen a particular video on youtube.com that they wish to view and in step 3, they cause the YouTube window to transition from background mode to foreground mode and be displayed on the TV 702, at which time they can open a third remote control window and proceed again in background mode to locate yet another video source either on YouTube.com or other sources on the web, or stored on media server 701 or elsewhere on their LAN.

FIG. 8 through 12 show flow diagrams describing the processes just described in the previous figures, as well as additional scenarios not yet described.

Figure 8:
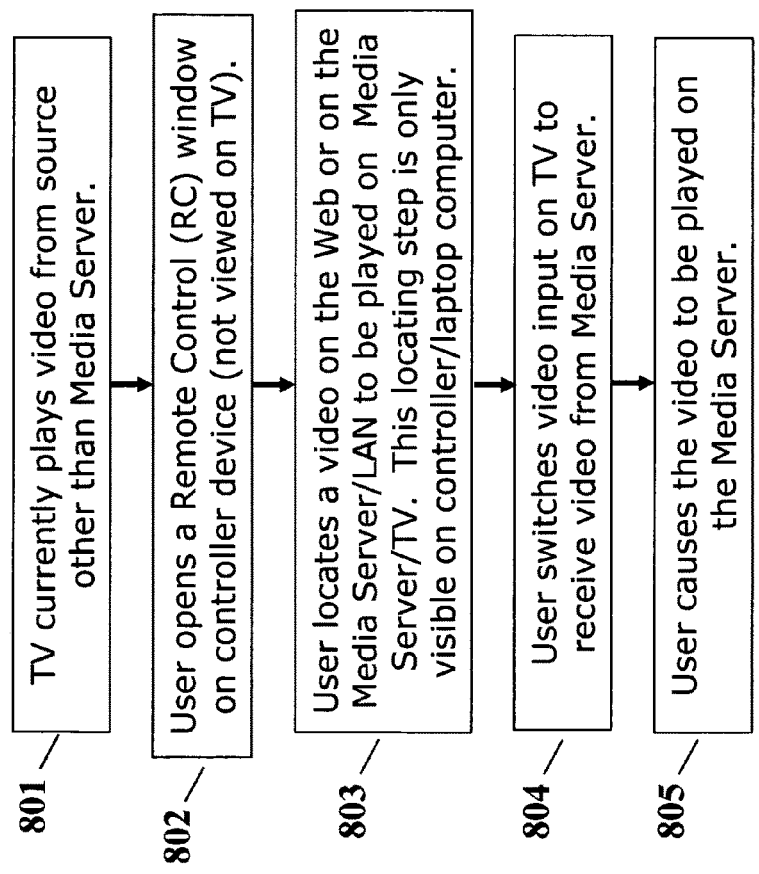
FIG. 8 shows a flow chart for the process described in FIG. 6.

FIG. 8 shows the process described in FIG. 6. In step 801, the TV currently plays a video source other than the media server while the user opens a remote control window (step 802) on their controller device (laptop computer), this window actually running on the media server but initially displayed only on the remote controller device. In step 803, the user locates a video on the web or on the server/LAN to be played next, and after switching (step 804) the video input control for the TV to accept material from the media server, this video material previously chosen on the media server under remote control by the laptop is now displayed (step 805) on the TV.

Figure 9:
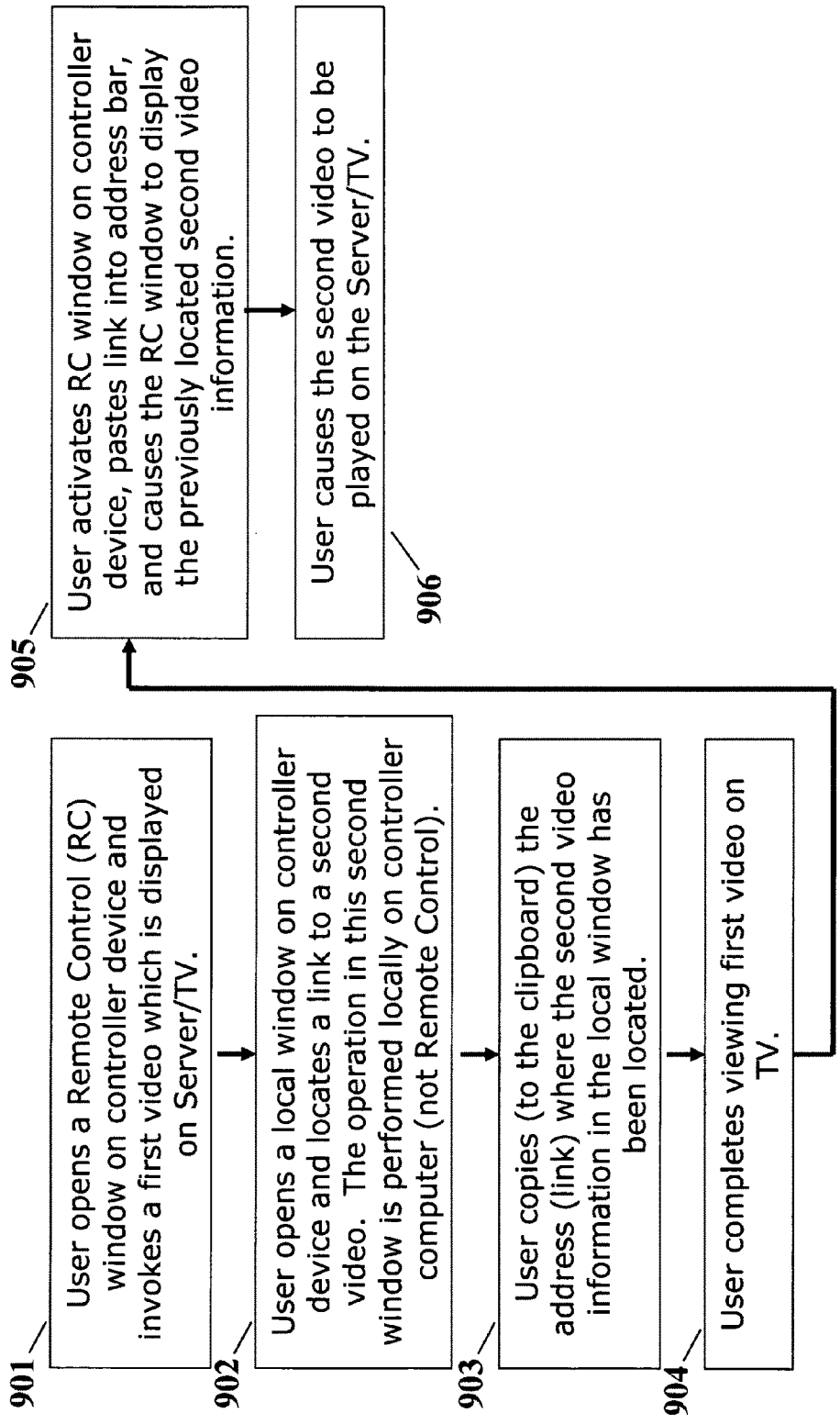
FIG. 9 shows a flow chart for a variation on the scenario of FIG. 8 wherein a second video source is located using a local browser window on the controller device, and the web address (URL) link for the second video source is passed to the media server by pasting it into the address bar in the remote control window on the laptop controller device.

FIG. 9 is similar to scenario of FIG. 8 except that while a first video is displayed (step 901) on the TV by the media server (under remote control from the laptop), the user opens (step 902) an additional local window on the controller device (not a remote control window) and, in this local window, locates another video source. The user then copies (step 903) the web address or link for this second video source to the clipboard on their laptop computer (controller device) and, after viewing of the first video is complete (step 904), subsequently pastes that link (step 905) into the address bar of the browser shown in their original remote control window—enabling the browser running on the media server to point to this second video source which is subsequently activated and played (step 906) on the media server and displayed on the TV.

Figure 10:
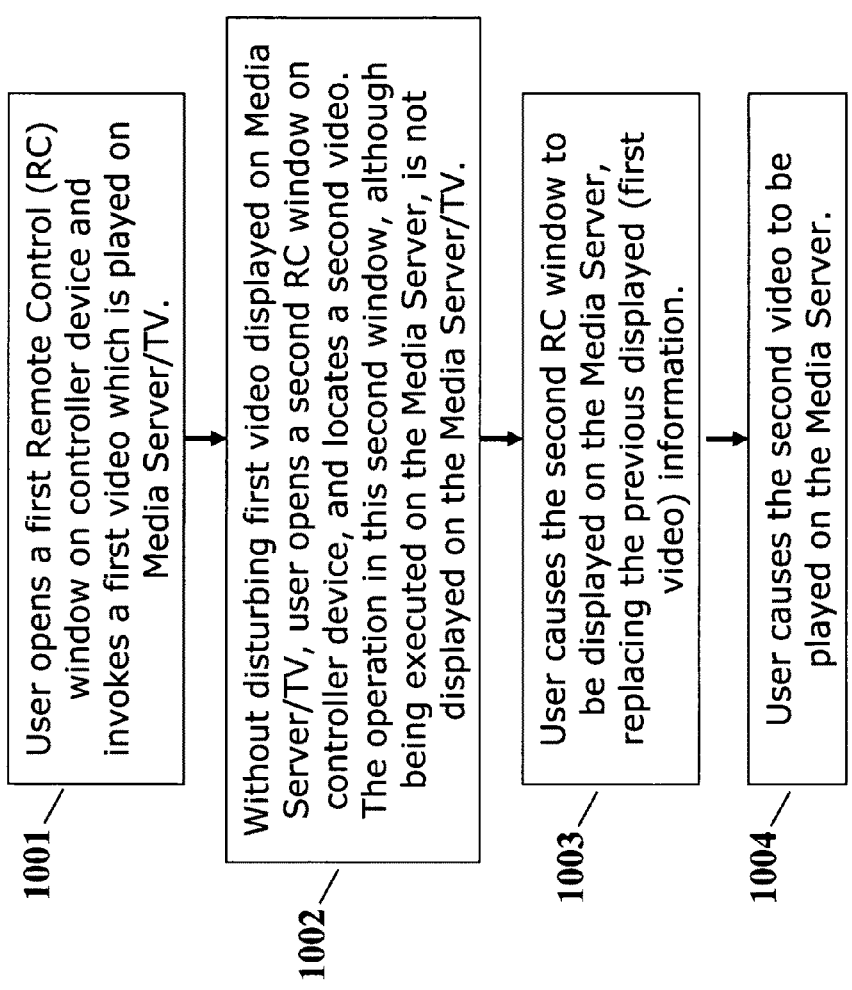
FIG. 10 shows a flow chart for the process described in FIG. 7.

FIG. 10 describes the process previously shown in FIG. 7 where the user opens a second remote control window (step 1002) on their laptop while a video previously chosen from a first remote control window (step 1001) is currently playing on the Media Server and TV. The process running on the media server controlled by this second remote control window is displayed on the laptop computer in the second remote control window (step 1002) but not displayed on the media server/TV even though it is actually running there, hence referred to as a "hidden active window". In other words, the second process runs as a background process on the media server while its user interface is visible on the controller device. At some point in time, the user subsequently causes the second remote control window contents, or a video located at a link displayed within the second remote control window, to be displayed (step 1004) on the media server thus replacing the previously displayed first video with the second video, the second video now appearing on the media server video output and TV display.

Figure 11:
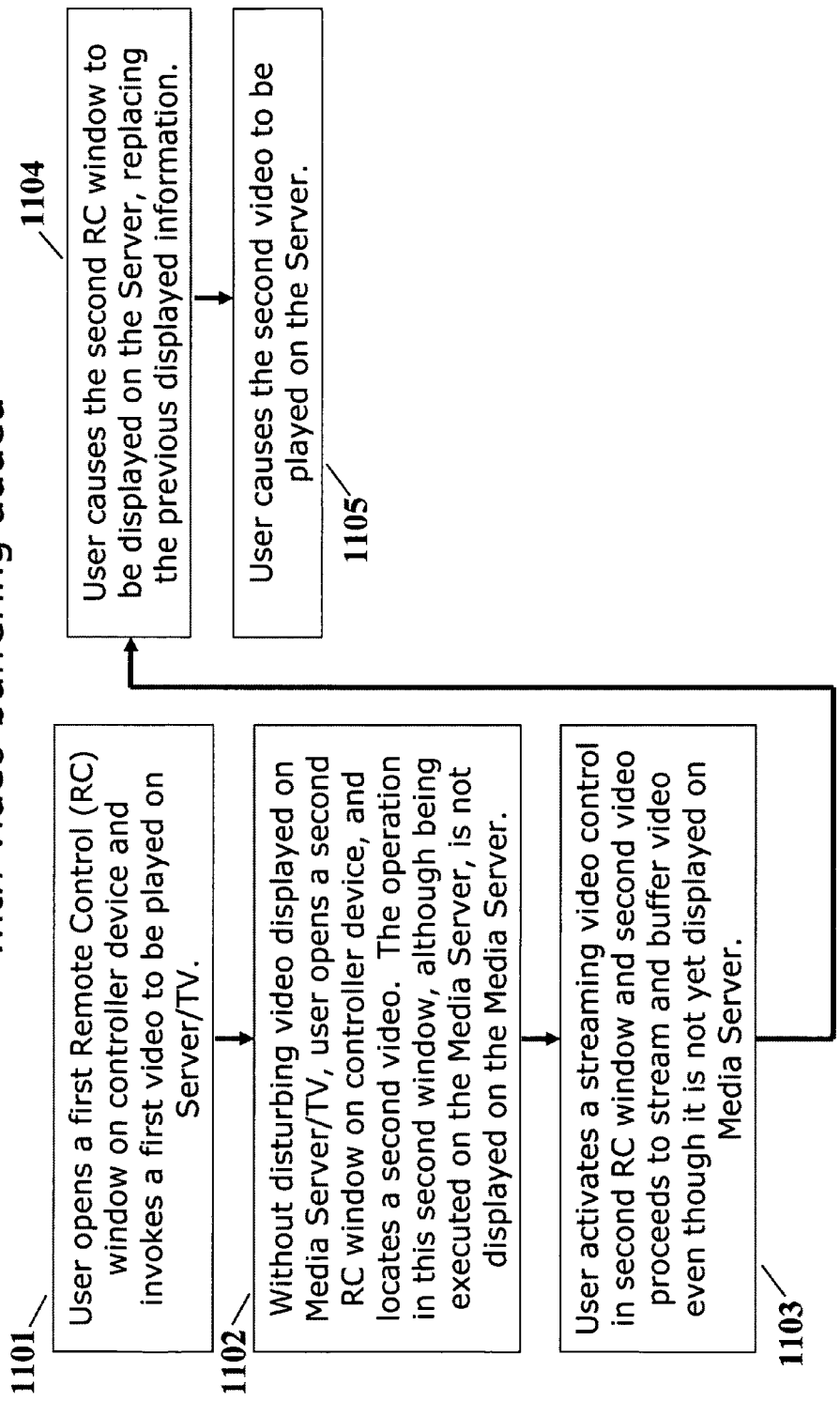
FIG. 11 shows a flow chart for an enhanced version of the process described in FIG. 10 wherein a second video stream is buffered while a first video is being displayed.

FIG. 11 shows an enhancement to the scenario of FIG. 10. Steps 1101 and 1102 are the same as steps 1001 and steps 1002. Then, in step 1103, the video located in the second remote control window and running on the server is activated to start the streaming/buffering process, the process being automatically paused when 100% buffering is reached. Thus, when the user switches from the first video being displayed on the media server/TV to the second video (step 1104), the stream for the second video will already be buffered and play can begin (step 1105) with no delay.

FIG. 12 shows a different paradigm to those in previous figures and is hereinafter called an "Activity Clone" paradigm. Here, the window running on the laptop computer is not a conventional remote control window as described previously herein, but instead is a local browser window running on the controller (laptop) device. However, this local window is special in that all user input activity that occurs in this "Activity Master" window on the laptop is recorded or monitored (step 1201). This recorded or monitored activity is then transferred through a wireless link to the media server and can be played back at a later point in time to replicate the previous activity on the laptop where video material was located and/or played. This method can also be used to simultaneously play video material on both the controller laptop and media server under control of the Activity Master window on the laptop per step 1202, with video material streaming from the Web to both the laptop and media server simultaneously. A multicast methodology can be used to perform this which would make more efficient use of available wireless network bandwidth. Thus, this scenario of cloning activity on the server which originates on the laptop in an Activity Master window, can either happen in a delayed mode where activity from the Activity Master window is replicated on the Media Server at a later time, or alternately this activity can be replicated in realtime effectively making operation of the Activity Master (on the laptop) and the Media Server, simultaneous. An Activity Master Window on the controller may also be used to control a hidden active window on the media server. As such, a second Activity Master Window can be used for locating a second video without disturbing a first video that is playing on the media server as a result of user activity initiated via a first Activity Master Window.

There are times when the media player software/codec required to play a particular video is not available on a particular media server. This can happen for a variety of reasons including scenarios including where the codecs on the media server are soft-coded and out of date, or the codecs in the media server are hard-coded in some manner and simply not capable of decoding a particular media compression format. When an application program running on the media server detects that the particular player software or codec is not available on the TV server, it could prompt the user that additional software needs to be installed (assuming a codec is soft coded). However, having to install software in order to view a particular video is not always desirable, and a better user experience can be delivered by automatically transcoding the particular video prior to delivery to the media server.

Figure 13:
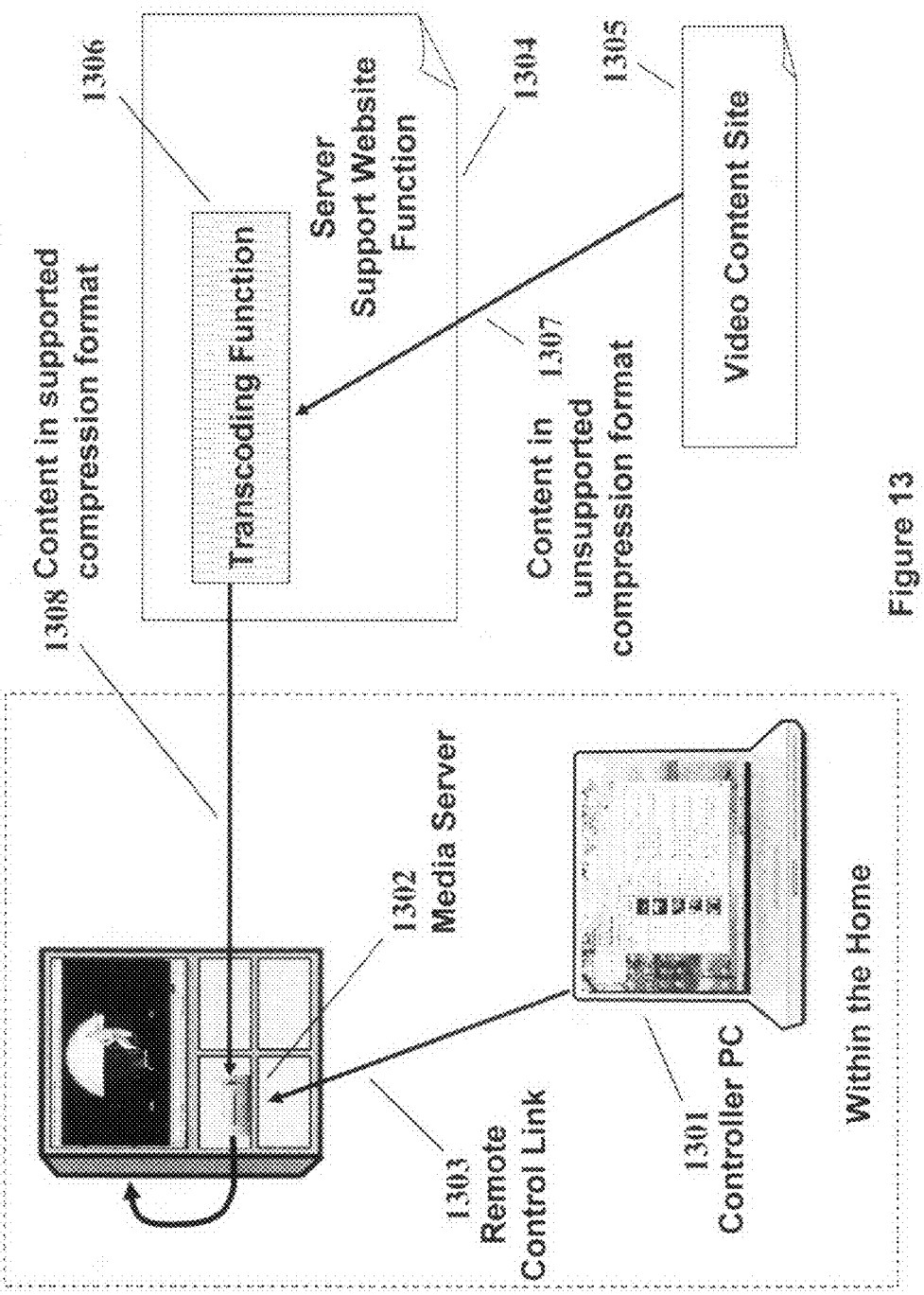
FIG. 13 describes a system and method for enabling a non-supported video stream to be played on a media server by transcoding that video stream on an intermediary website.

As shown in FIG. 13, controller PC 1301 directs media server 1302 by way of remote-control link 1303 to play a particular video that is to be streamed from content website 1305 on the Internet. If media server 1302 does not have the capability to decode the particular video stream because it is in a non-supported compression format (not supported by the codecs in the media player), media server 1302 sends a message to server support website function 1304. The (unsupported) video stream 1307 coming from video content site 1305 is then delivered through the Internet first to server support website 1304 where it is transcoded on-the-fly by transcoding function 1306. The (now supported) video stream 1308 is then delivered through the Internet to the user's media server 1302, without the user having to do any additional software or codec installations. Media server 1302 may now play video stream 1308 since video stream 1308 is in a format supported by a resident codec on media server 1302.

It is a generally recognized fact in the industry that on a LAN (local area network), individual computers are able to establish an Internet connection with significantly greater ease than they establish a connection with each other. The problem has worsened in recent years as more security features have been added to personal computers. For the majority of homes which have multiple computers connected through a wireless router to the Internet, while each computer is able to access the Internet, these computers never access each other. The process of establishing a network connection is not intuitive to the average user—especially since the task is performed so seldom. Even when and the user is proficient enough to attempt this task using tools such as Microsoft's "Map Network Drive" command on the Tools menu, the operation is frequently unsuccessful. This may happen for a variety of reasons, some of which include inconsistencies in how different PCs and different operating system variations respond to packet broadcasts, and also the issue of work group designations. It is not always apparent to the user which workgroup a particular PC belongs to, or should belong to. Worse, if a PC like a laptop is used in multiple locations (e.g., both at work and at home), a workgroup name may be established for their computer by the IT department at their office, and when this same laptop is brought home for use in a home network where a different workgroup name has been established, it becomes difficult or impossible for the typical user to establish network connections with other PCs at home. Additionally, the network facility within many Microsoft operating systems is server oriented and when a PC is added to the network there may be confusion among the different computers on the LAN relative to "which PC is the server", depending on the sequence of PCs joining the network and which PCs are active at the particular time. There may be additional reasons why network connections are so difficult to establish in the home including issues involving the WINS function and NetBIOS, but regardless, it is generally acknowledged that PCs connect much more readily with the Internet than they do with each other on a LAN.

For an application such as a controller PC remotely controlling a media server via a LAN connection, the controller PC must be able to uniquely address the media server. It turns out that on most Microsoft operating systems, referring to the media server by its computer name tends to only be successful when a network connection has previously been established by way of Microsoft's "Map Network Drive" command on the Tools menu. If this has not previously been done, referring to the media server according to its computer name will often not produce the desired connection, and one must rely on the absolute IP address of the media server. Unfortunately, in most homes, IP addresses are a result of a DHCP server which assigns dynamic IP addresses. This means that when either the media server or the router/gateway is rebooted, either intentionally or due to a power outage, the media server may end up having a different IP address as a result. Thus using absolute IP addresses can be unreliable from day to day. In addition, the average user is not accustomed to running the "ipconfig" command from the command line prompt on a PC in order to determine the new IP address when it changes. Further, a media server residing in an entertainment center cabinet should really be a "headless" PC, having no keyboard, and should reinitialize upon rebooting with no intervention from the user.

Figure 14:
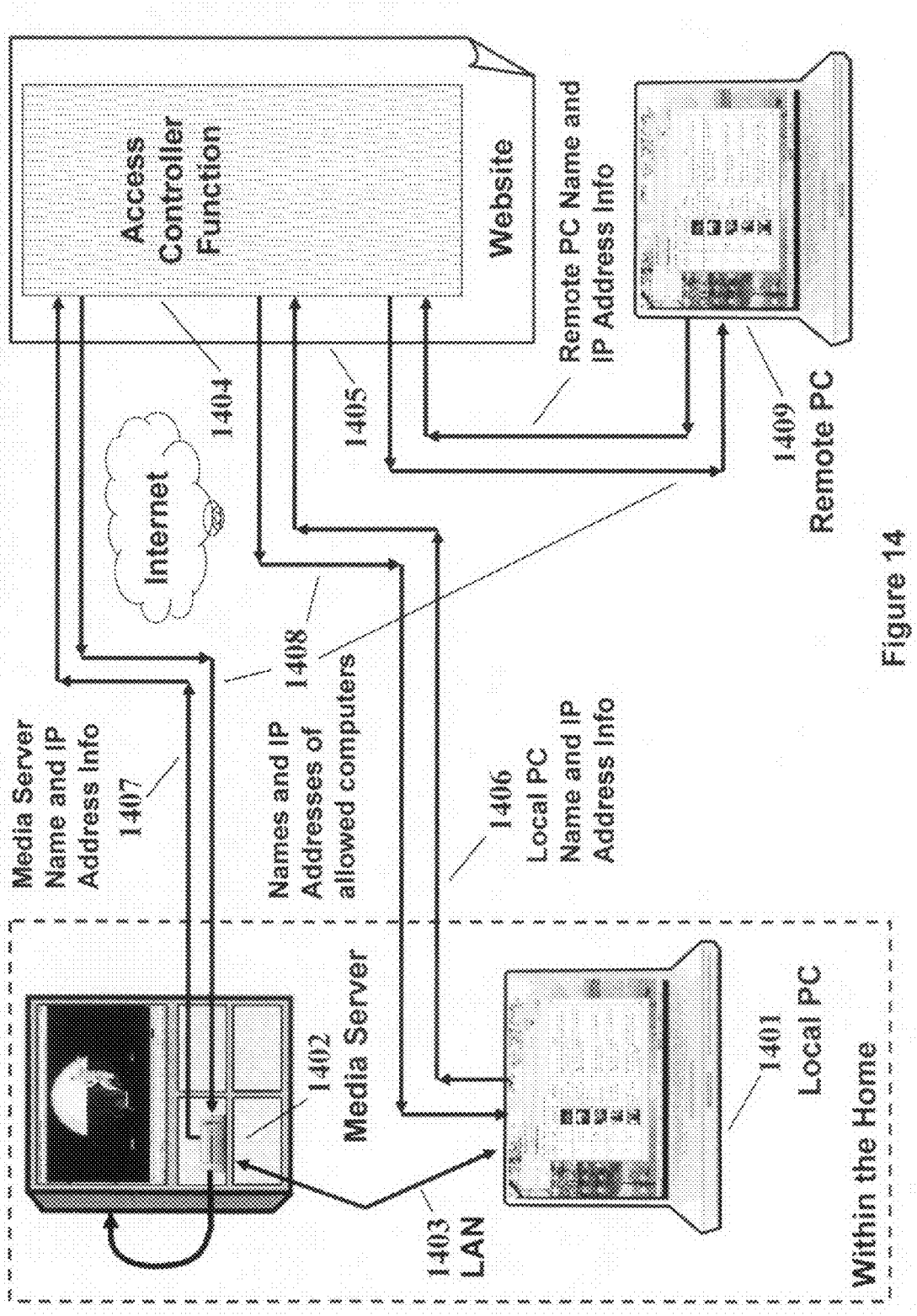
FIG. 14 describes a system and method for enabling different computers on a network to reliably locate each other by absolute IP address at any point in time.

It is therefore important to have a reliable means for one PC to locate another PC on the same LAN and automatically establish a connection. Information flow for a solution to this problem is shown in FIG. 14. Here, local (controller) PC 1401 and media server 1402 reside on LAN 1403 in a user's home. Both local PC 1401 and media server 1402 send information regarding their identity and local environment (together referred to as "environment information" hereinafter) via the Internet to the access controller function 1404 residing on access control website 1405. The controller PC 1401 sends computer name and IP address information 1406, along with other environment information, while the media server sends similar environment information including computer name and IP address information 1407. Access controller function 1404 then analyzes this information and returns computer names and IP address information 1408 of all computers available for connection on the user's network to all computers on the user's network, be it a conventional LAN, a VPN (virtual private network), or a private network of any kind. Normally this functionality may be used within a LAN according to the media server remote control functionality of the present invention, however it may also be used for a remotely located PC such as PC 1409, although identifying a remote PC for inclusion in a user's network environment requires a different analysis by access controller function 1404 than for those PCs that reside on the LAN.

Figure 15:
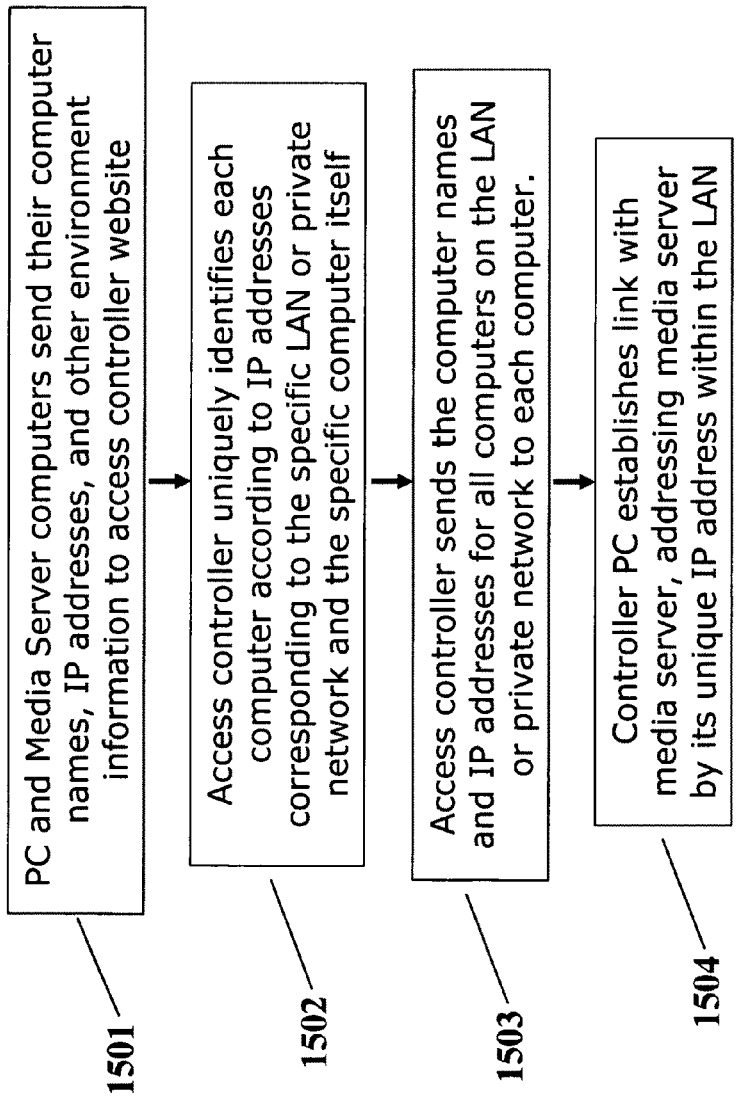
FIG. 15 shows a flow chart for the process described in FIG. 14.

The flowchart of FIG. 15 describes the process represented by the system and information flow of FIG. 14. In step 1501, the PC and media server computers send their computer names, IP addresses, and any other required environment information to the access controller website for processing. As part of the environment information that is sent, a variety of status and service discovery information may also be sent. In step 1502, the access controller uniquely identifies each computer according to the information supplied and determines that the computers in fact belong to the same network and should be allowed to talk. Optionally, software running on the PCs and media server involved may also provide additional forms of environment information to the access controller which uniquely identify the particular user or the user's organization, and also may identify a particular network belonging to a user or organization. In step 1503, the access controller sends the appropriate computer names and IP addresses to all computers in the network to enable connections between computers. Finally in step 1504, the controller PC may establish its link with the media server by using the unique IP address within the LAN or private network for the media server, that address having been supplied by the access controller.

This process is repeated at regular intervals such that any changes in IP addresses as a result of dynamic address assignment by a DHCP server will not affect the connectivity within the system as perceived by the user. The chosen interval may vary with the system and the user, and the interval may be as short as seconds or milliseconds or as long as minutes. While the functionality of FIGS. 14 and 15 is described with regard to the present invention where a media server is remotely controlled by another computer, the functionality of FIGS. 14 and 15 can also be used for establishing connectivity between multiple computers in any network—LAN or WAN—physical or virtual.

Computer and network status as well as service discovery information may also be sent as part of the environment information, and may include:
 Host discovery
 Name resolution
 Protocols:
  DNS
  Dynamic DNS
  Multicast DNS
  WINS
  NetBIOS over TCP/IP Name Resolution and WINS
 Name types:
  Host names
  NetBIOS names
 Service discovery:
  Apple Multicast DNS/DNS-SD
  Apple Bonjour
  Microsoft UPnP SSDP
  IETF Zeroconf
   Automatic Interface Configuration
   Automatic Multicast Address Allocation
   Name-to-Address Translation (and vice versa)
   Service Delivery
  Microsoft Function Discovery Provider Host
  Windows Media Center Extender Service FIG. 16 further describes how PCs and other controller devices on a LAN may locate a media server with assistance from an Internet-based access controller function, with particular detail shown here with regard to IP addresses. It is generally known in the art that a computer at one physical location may communicate via the Internet with a computer at another physical location in order to establish a VOIP (voice over Internet protocol) conversation. However, these functionalities focus on connections routed through the Internet and do not focus on the unique circumstances involved in establishing connections within a LAN. In fact, when attempting to make connections between two PCs on a LAN via an Internet-routed VOIP functionality, packets originating within the LAN will be routed via the external port on the gateway/router and thus will experience lower performance compared with being routed directly within the LAN based on the specific LAN characteristics. Internet-routed VOIP functionalities also fall short of automatically making decisions regarding allowable connections and automatically establishing those connections. In addition, these VOIP functionalities do not include service discovery information with regard to LAN connectivity, nor do they aid in or automatically conduct network configuration.

Figure 16:
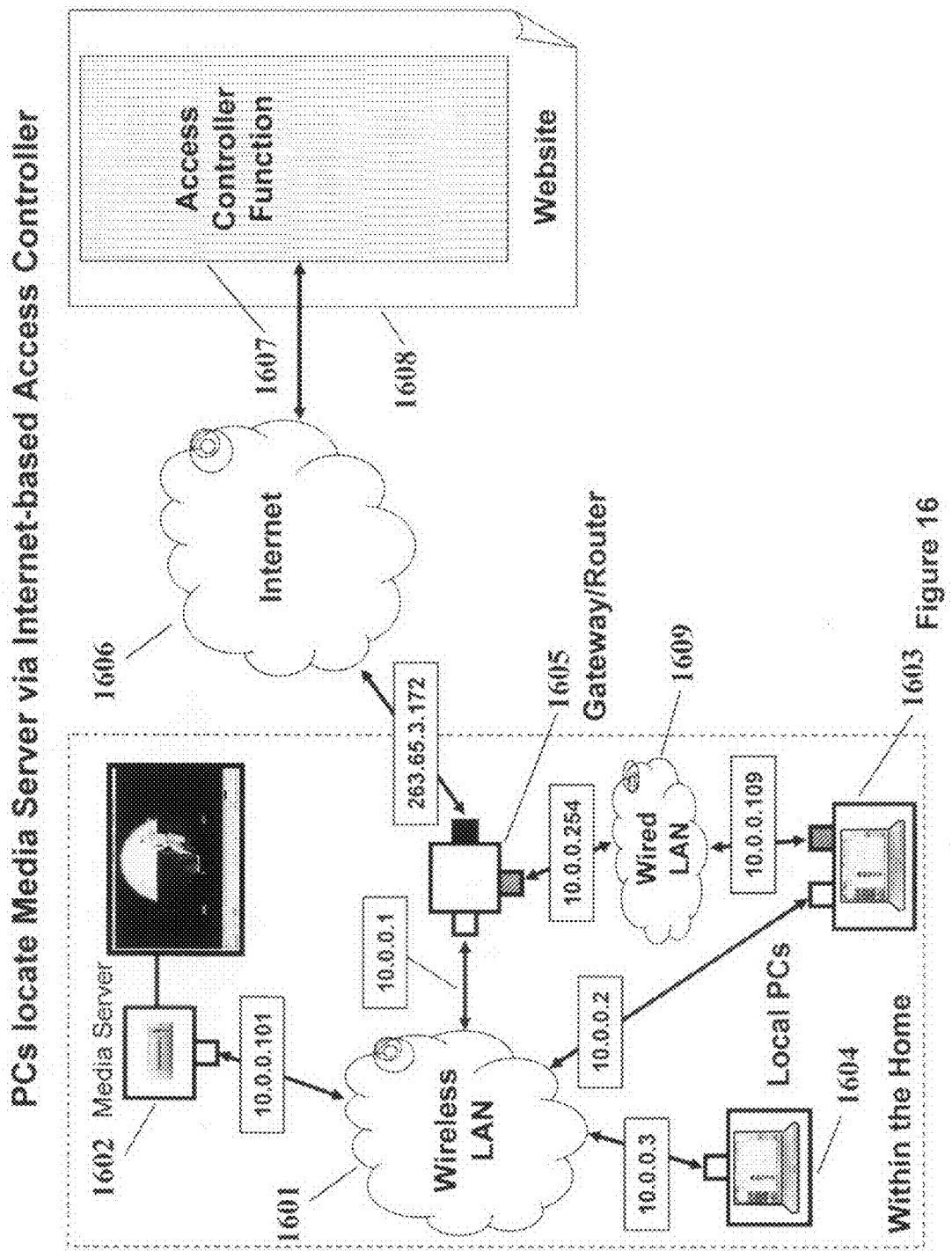
FIG. 16 shows another view of the system described in FIG. 14, with emphasis on IP addresses assigned to different devices on the LANs.

FIG. 16 shows a wireless LAN 1601 within a home which connects a media server PC 1602 with local PCs 1603 and 1604 and a gateway/router 1605 which in turn, interfaces with the Internet 1606. Also present within the home is a wired LAN 1609 which connects gateway/router 1605 with local PC 1603. It is prevalent that the gateway/router in a home presents a single IP address to the Internet. In this case, gateway/router 1605 presents the IP address <263.65.3.172> to the Internet 1606. For homes, this IP address is typically a dynamic address and subject to change from time to time. In order to conserve IP addresses, gateway/routers used in most homes utilize an implementation called NAT (network address translation) that allows multiple local IP addresses to be utilized within the LAN while presenting only a single IP address to the Internet. Gateway/router 1605 keeps track of which device on the LAN is communicating with the Internet according to port numbers utilized in the communication. Within the LAN there are conventions for what IP address formats are used, and some of the most frequently utilized IP address notations begin with either "10" or "192". In the example of FIG. 16, all of the internal IP addresses within the home begin with "10". Gateway/router 1605 presents different IP addresses to the wireless LAN 1601 <10.0.0.1> and the wired LAN 1609 <10.0.0.254>. PC 1603 can choose to communicate with the gateway/router through either LAN available to it, and uses IP address <10.0.0.2> when communicating via wireless LAN 1601, and IP address <10.0.0.109> when communicating via wired LAN 1609. Typically, communications on the wired LAN are more desirable when this connection type is available, due to its superior speed compared with a wireless LAN connection. Note that while this example shows a wireless LAN and a wired LAN that are co-resident in a home connected to the Internet via a single gateway/router, a home may in fact contained multiple wireless LANs, again connected to a single gateway/router. When the multiple LANs, including any of wired and wireless LANs, are present in the home, the network can be configured such that the bandwidth involved in the remote control and display of videos is distributed over multiple LANs. Such a distribution may involve using one LAN which is in fact much slower than another LAN. However in spite of this fact, the overall performance of the networks in the home for the remote control, distribution, and display of video information according to this invention may in fact be maximized.

Notice in this example that all IP addresses within the home take the form <10.0.0.xxx>. According to this invention, connection software on each device within the home that participates in the connection methodology described herein will include the local IP addresses associated with each device as part of the identity and environment information which is sent to access controller function 1607 located on website 1608 on the Internet 1606. Thus, access controller function 1607 will know that all devices communicating by way of IP address <263.65.3.172> are on the same LAN and send information indicating as much back to connection software running on each device on the LAN. Each local PC 1603 or 1604, could, if desired by the user, become a controller for media server 1602. Based on the identity information supplied by access controller function 1607, a local PC used as a controller device will have knowledge of the local IP address <10.0.0.101> for media server 1602. This controller device will then be able to directly address video server 1602 according to local IP address <10.0.0.101>, and thus establish a connection without totally relying on the operating system's (often inadequate) network connection methodologies. With guidance from access controller function 1607, connection software on each device on the LAN may automatically configure connections between potential controller devices and potential media servers. These automatically established connections may be done either with or without explicit permission from the user depending upon the chosen implementation.

Figure 17:
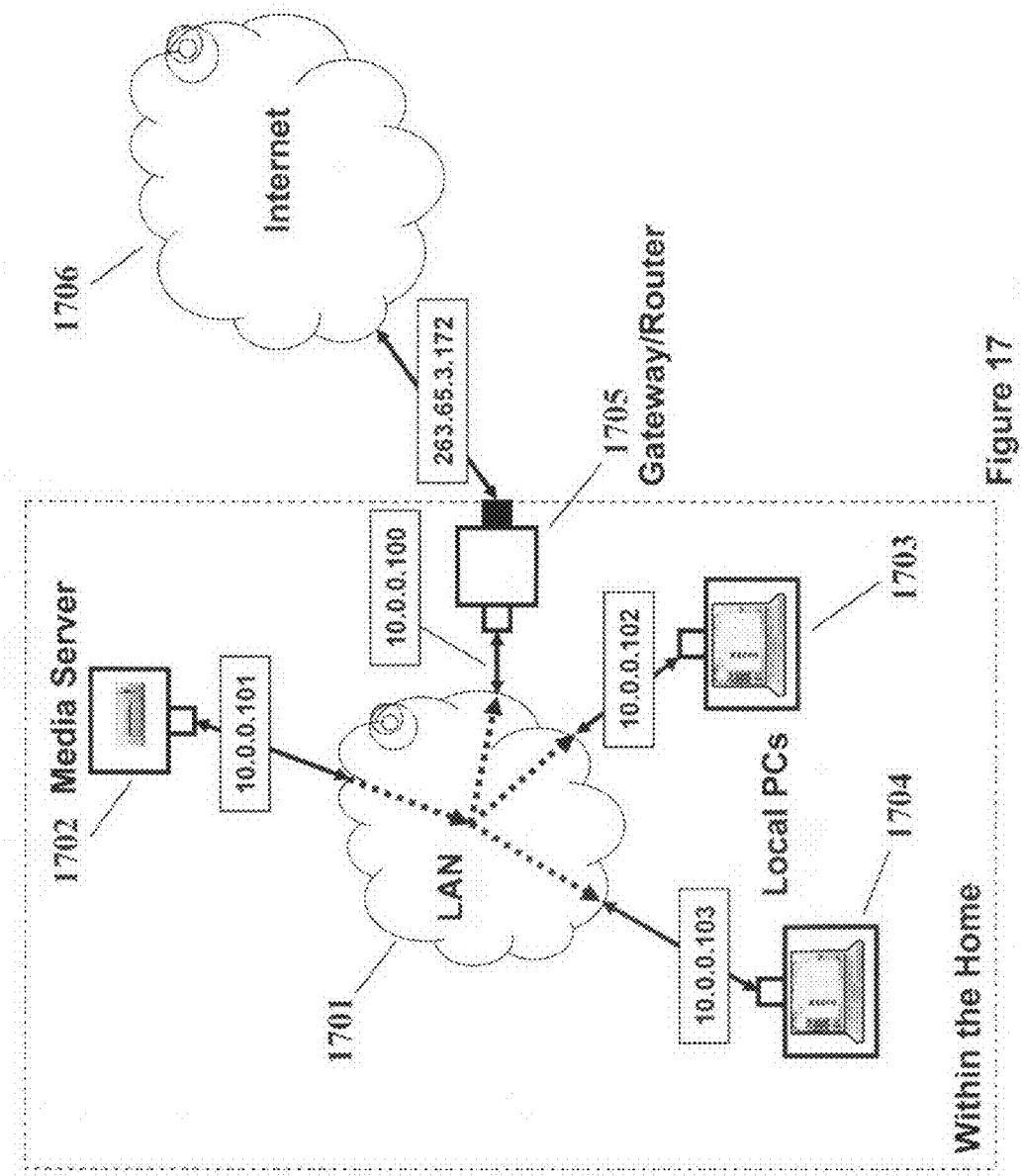
FIG. 17 shows a diagram describing an alternate method of IP address discovery on a LAN whereby the media server broadcasts its IP address to other devices on the LAN.

There may be times when web-based access controller function 1607 is not available to users within a LAN, due to a problem with website 1608 or some issue with the Internet or the user's ISP in particular. It may therefore be desirable to have an alternative methodology available within the LAN for connections between the controller device and media server. Such a methodology as shown in FIG. 17. Here, LAN 1701 connects media server 1702 with local PCs 1703 and 1704, either of these local PCs capable of becoming a controller device. According to one embodiment of this invention, media server 1702 will regularly broadcast its local IP address <10.0.0.101> to other devices on the LAN either by implementing a broadcast packet methodology, or by implementing a series of messages targeting individual IP addresses on the LAN, in this example <10.0.0.100>, <10.0.0.102>, and <10.0.0.103>. If the target devices on the LAN are able to properly receive the broadcast packet intended for them, they will then understand the local IP address for media server 1702 and be able to directly address the media server by this address in order to establish a direct connection for implementing remote control functionality per this invention.

FIGS. 18 through 21 address a media server remote control functionality that involves not one window and video displayed on the media server, but two or more. This functionality is especially useful for observing multifaceted events where multiple views are possible, and where one particular user or user family may wish to watch a different set of possible views than other families might. Examples of such applications involve racing events, where users may choose to view certain cars or certain places on the track, as well as Olympic-class sporting contests where a large number of events occur simultaneously and conventional TV coverage is very limited since only one event can be viewed at a time. With the advent of widescreen TVs the ability to watch more than one event or more than one view of a particular event becomes possible, and if supported by functionality implementing a multiple view display and an appropriate selection and remote control capability, the user can at any time choose a particular event or view to fill the entire screen if desired.

Figure 18:
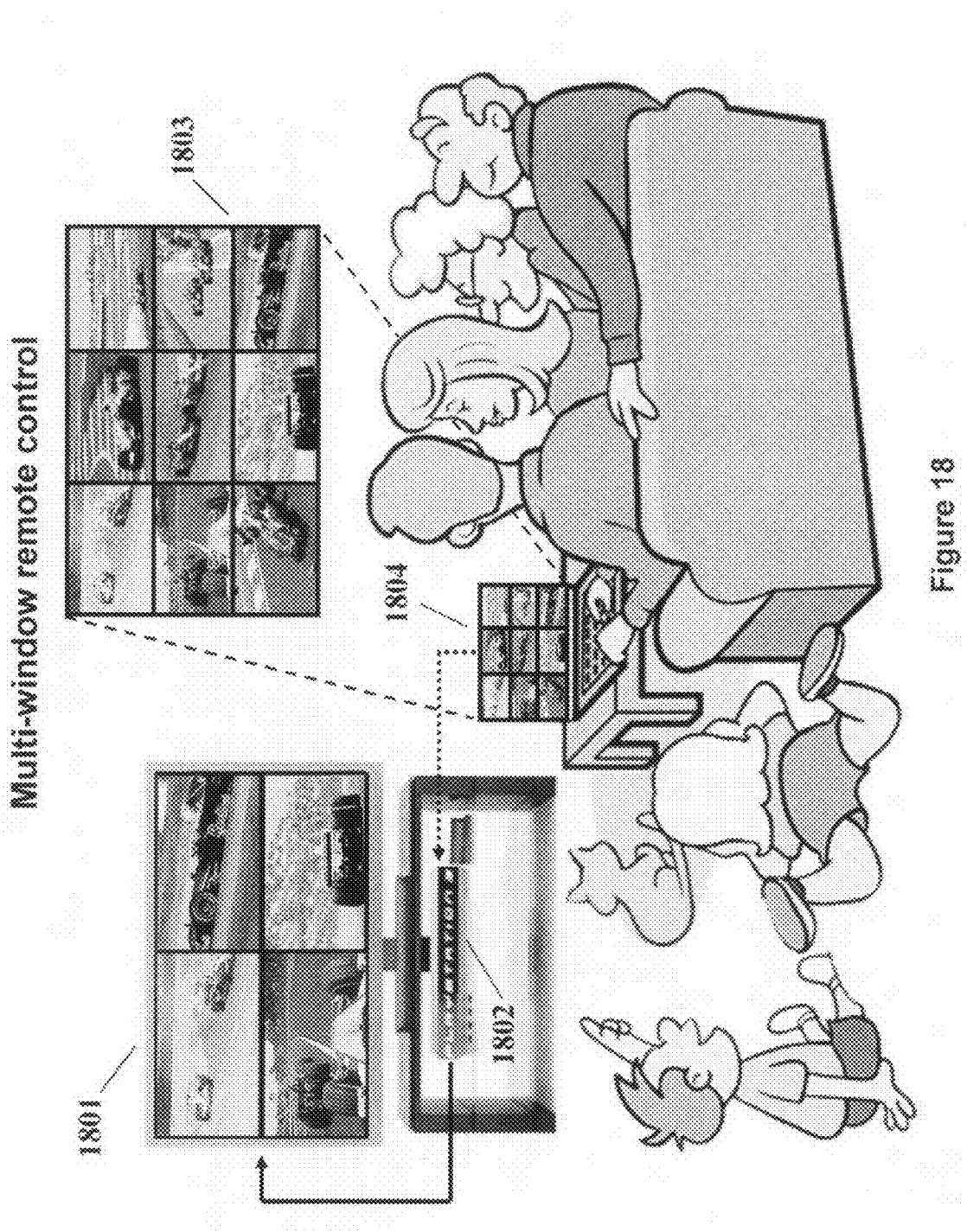
FIG. 18 shows an overview of a multi-window, multi-view display on a media server and TV whereby videos to be chosen for display on the media server also appear on a controller device and are selected for viewing on the media server and TV by remote control from the controller device.

FIG. 18 shows an overview of such a system where widescreen TV 1801 displays four different views of a racing event. TV 1801 acts as the display for media server 1802 which is remotely controlled from laptop computer controller device 1804. A display of possible views that a user may choose is shown on screen 1803 of controller device 1804.

Figure 19:
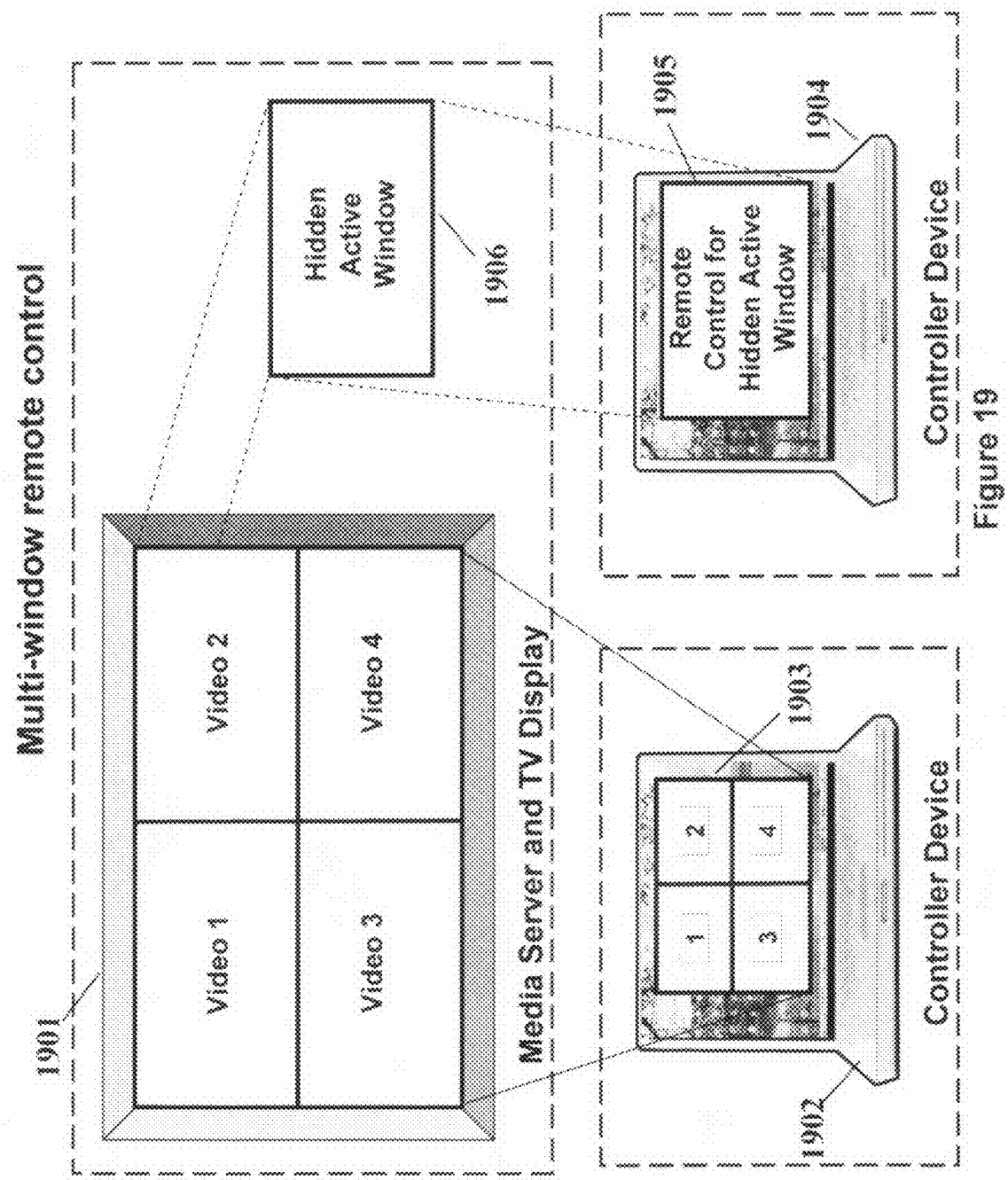
FIG. 19 shows two different methods for remotely controlling the multi-window, multi-view display of FIG. 18, one method involving direct remote control of the media server and its display, and the other method involving remote control of a hidden active window on the media server which may, a later point in time, replace a displayed window on the media server display.

FIG. 19 shows different methods for implementing such a multi-view, multi-window capability. Here the TV display 1901 driven by a media server shows four different views simultaneously in four windows. A controller device 1902 may remotely control the media server according to the embodiment of this invention per FIGS. 6 and 8, where the media server windows shown on display 1901 are directly manipulated according to user-initiated activity in remote control window 1903 on controller device 1902. Alternately, controller device 1904 may be used where remote control window 1905 is used to control a hidden active window 1906 on the media server in a manner similar to that described in FIGS. 7 and 10. Here, the user of controller device 1904 would use a hidden active window to locate additional views or videos they wish to watch as part of multi-view, multi-window display 1901, and when they have located material they wish to view, they initiate an action causing one window on display 1901, in this case the window labeled "Video 2", to be replaced with the new material previously located using hidden active window 1906.

Note in FIG. 19 that the four video windows shown on media server display 1901 may represent four separate browser windows in some implementations. In such cases, it is desirable that a video being displayed fills each entire browser window. However, this is in contradiction with the implementation convention observed by the creators of most popular software media player programs such as Windows Media Player, Adobe Flash player, and others. All popular media player software programs have the ability to play a video in a portion of an active window. Additionally for some software media players, when the user requests "full screen", they fill the entire computer screen with the video image. What is needed for the scenario of FIG. 19 is a "full screen" mode that fills the entire window with the video, but not the entire computer screen. Accordingly, the disclosed embodiments of this invention shall also include the capability for a software media player to optionally fill an entire window with a video image rather than filling the entire computer screen.

Figure 20:
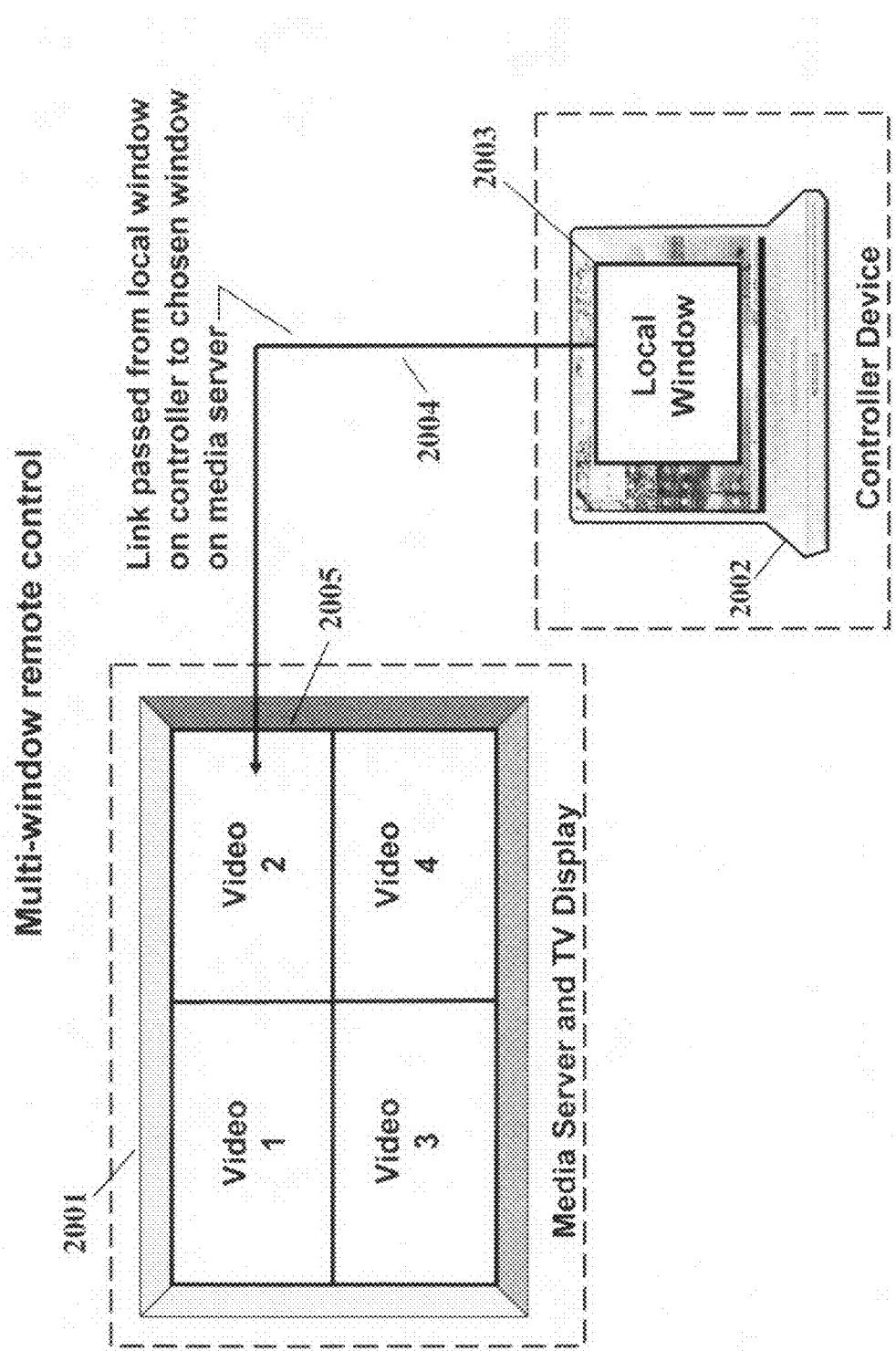
FIG. 20 shows another method for remotely controlling the multi-window, multi-view display of FIG. 18, whereby a link to a web video is located in a local window on the controller device, this link being passed to a window on the media server by way of a remote control connection on the LAN.

Another variation on remotely controlling a multi-view, multi-window display is shown in FIG. 20 where display 2001 is controlled by controller device 2002. Here, local window 2003 is used to locate additional views or videos to be watched on multi-window display 2001. When the user locates material they wish to add using local browser window 2003, the address link for that material from local window 2003 is passed through network connection 2004 to the media server and as shown in FIG. 20, that material replaces the view or video previously shown labeled as "Video 2". This functionality is similar to that for link passing between the controller and media server described with regard to FIG. 9. Thus, using any of the embodiments according to FIGS. 6, 7, 8, 9, and 10, a controller device may be used to locate additional views or videos the user wishes to watch as part of a multi-view, multi-window display on the media server and TV, with an additional view or video selected using the controller device replacing a view or video on the media server in response to an action supplied by the user.

Regardless of which method is implemented for remotely controlling a multi-window, multi-view display from a controller device, it is desirable to create the overall functionality shown in FIG. 21 utilizing one of these remote control methodologies. In FIG. 21, multi-window display 2101 shows four videos or views displayed simultaneously. Controller device 2102 presents the user with display 2103 having a larger number of views than are currently displayed on the media server and TV 2101. Virtually every sporting event has multiple cameras generating multiple feeds but typically only one feed is selected by the programming director for conventional TV broadcast. Via the Internet, a TV network can make multiple video feeds from different cameras available to the user who, according to this invention, observes them on the controller device. The user would observe display 2103 and select a subset of views to be displayed on media server and TV 2101. Hence, the choice of displaying the four particular views as shown in FIG. 21 would then be performed by remote control links 2104 which may be implemented by any of direct remote control, remote control of hidden active windows, or link passing from a local window on the controller device to the media server. Also, for any of the embodiments described herein for a multi-window, multi-view display on a media server, the user would optionally have the capability to select the contents of a single window or view to be displayed covering the entire TV screen in response to an action taken by the user by way of the controller device.

When a particular video is displayed simultaneously on both the controller and media server, it may be advantageous to utilize a multicast methodology to simultaneously stream the video to both the controller and media server in order to minimize bandwidth utilization on the LAN and on the user's external Internet connection.

Thus, the foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, unless otherwise specified, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A method for controlling, from a controller device on a LAN, a media server connected to the LAN and having a video output connected to a TV, comprising the steps of:

opening a first remote control window on the controller device, while the TV displays a video source other than the media server video output, said first remote control window displaying an active screen image of at least a portion of the media server desktop screen;

wherein said active screen image is a fully functional user interface recreation of said at least a portion of the media server desktop screen, including a recreation of video displayed by the media server, where all recreated information is transferred between the media server and the controller device by way of the LAN, with operational control of the media server performed by the controller device according to user actions operating the recreated media server user interface within the remote control window on the controller device;

locating, by utilizing the functionality available within the first remote control window, a first video located on the Web or on the LAN;

changing the selected video input on the TV such that the media server video output is chosen for display on the TV;

causing, by utilizing the recreated media server user interface available within the first remote control window, the previously located first video to be played on the Media Server and displayed on the TV;

opening a local window on the controller device, while simultaneously the first video plays on the Media Server and TV;

locating, within the local window, a link to a second video, said second video being located on the Web or on the LAN;

copying, to the clipboard of the controller device, the link to the second video;

pasting the link to the second video into the address bar of a browser window within the first remote control window, whereby the link to the second video is transferred to the media server through the LAN;

causing, by utilizing the recreated media server user interface available within the first remote control window, the second video to be played on the Media Server and displayed on the TV, thereby replacing the first video opening a second remote control window on the controller device, while the visible window on the media server displays the first video on the TV, wherein the process on the media server corresponding to the second remote control window initially runs in the background as a hidden active window on the media server;

wherein no portion of the user interface for the hidden active window is displayed on the media server video output and TV display while the hidden active window is hidden;

wherein the user interface for the hidden active window is displayed only on the controller device while the hidden active window is hidden; and wherein all user interface information related to operation of the hidden active window is transferred between the controller device and the media server; locating, utilizing the hidden active window on the media server by and operating the user interface for the hidden active window from within the second remote control window on the controller device, a second video located on the Web or on the LAN; and wherein the hidden active window to is made visible on the media server in response to a user input on the controller device, thereby playing the second video on the media server, said second video replacing the first video displayed on the TV display.

2. A system for selecting and displaying web videos on a TV set, comprising:

a media server having a video output attached to a video input of a TV set, said media server also having network connections to a LAN and the Internet;

a controller device having a keyboard and display, said controller device also having network connections to the LAN and the Internet;

wherein the media server screen simultaneously displays two or more windows, each window displaying a video, and where the video in each currently displayed window has been previously selected by the controller device, each video selection being communicated from the controller device to the media server by way of the LAN;

wherein the controller device display includes a first remote control window comprising a fully functional recreation of the media server user interface, including a recreation of video displayed by the media server, where all recreated information is transferred between the media server and the controller device by way of the LAN, with operational control of the media server performed by the controller device according to user actions operating the recreated media server user interface within the remote control window on the controller device;

wherein the method for selection of videos by the controller device for display on the media server is further accomplished by the steps of:

opening a second remote control window on the controller device, the process on the media server corresponding to the second remote control window running in the background as a hidden active window on the media server and thus not being displayed on the media server video output and TV display;

wherein the user interface for the hidden active window is displayed only on the controller device; and wherein all user interface information related to operation of the hidden active window is transferred between the controller device and the media server;

locating, utilizing the hidden active window on the media server and operating the user interface for the hidden active window from within the second remote control window on the controller device, an additional video located on the Web or on the LAN; and causing, in response to a user input on the controller device, said additional video to replace one of the currently displayed videos on the media server and thereby causing the additional video to be played on the media server.

3. A method for controlling, from a controller device on a LAN, a media server connected to the LAN and having a video output connected to a TV, comprising the steps of:

opening a first remote control window on the controller device, said first remote control window providing a recreation of the media server user interface;

locating, by utilizing the functionality available within the first remote control window, a first video;

causing, by utilizing the functionality available within the first remote control window, the previously located first video to be played in a visible window on the Media Server and displayed on the TV;

opening a second remote control window on the controller device, while the visible window on the media server displays the first video on the TV, wherein the process running on the media server corresponding to the second remote control window initially runs in the background as a hidden active window on the media server;

wherein no portion of the user interface for the hidden active window is displayed on the media server video output and TV display while the hidden active window is hidden;

wherein the user interface for the hidden active window is displayed only on the controller device while the hidden active window is hidden; and wherein all user interface information related to operation of the hidden active window is transferred between the controller device and the media server;

locating, utilizing the hidden active window on the media server and operating the user interface the hidden active window from within the second remote control window on the controller device, a second video; and wherein the hidden active window is made visible on the media server in response to a user input on the controller device, thereby playing the second video on the media server, said second video replacing the first video displayed on the TV display.

4. A system for selecting and displaying web videos on a TV set, comprising:

a media server having a video output attached to a video input of a TV set, said media server also having network connections to a LAN and the Internet;

a controller device having a keyboard and display, said controller device also having network connections to the LAN and the Internet;

wherein the media server screen simultaneously displays two or more windows, each window displaying a video, and where the video in each currently displayed window has been previously selected by the controller device, each video selection being communicated from the controller device to the media server by way of the LAN;

wherein the controller device display includes a first remote control window comprising a fully functional recreation of the media server user interface, including a recreation of video displayed by the media server, where all recreated information is transferred between the media server and the controller device by way of the LAN, with operational control of the media server performed by the controller device according to user actions operating the recreated media server user interface within the remote control window on the controller device;

wherein the method for selection of videos by the controller device for display on the media server is further accomplished by the steps of:

opening a second remote control window on the controller device, the process on the media server corresponding to the second remote control window running in the background as a hidden active window on the media server and thus not being displayed on the media server video output and TV display;

wherein the user interface for the hidden active window is displayed only on the controller device; and wherein all user interface information related to operation of the hidden active window is transferred between the controller device and the media server;

locating, utilizing the hidden active window on the media server and operating the user interface for the hidden active window from within the second remote control window on the controller device, an additional video located on the Web or on the LAN: and causing, in response to a user input on the controller device, said additional video to replace one of the currently displayed videos on the media server and thereby causing the additional video to be played on the media server wherein the number of windows containing videos that are simultaneously displayed on the media server display comprises at least four windows.

* * * * *